United States Patent [19]
Ho et al.

[11] Patent Number: 6,160,987
[45] Date of Patent: *Dec. 12, 2000

[54] COMPUTER-AIDED GROUP-LEARNING METHODS AND SYSTEMS

[76] Inventors: Chi Fai Ho, 4816 Cabello Ct., Union City, Calif. 94587; Peter P. Tong, 1807 Limetree La., Mountain View, Calif. 94040

[*] Notice: This patent is subject to a terminal disclaimer.

[21] Appl. No.: 09/474,278

[22] Filed: Dec. 29, 1999

Related U.S. Application Data

[63] Continuation of application No. 09/015,653, Jan. 29, 1998, Pat. No. 6,029,043.

[51] Int. Cl.$^7$ .................................................. G09B 3/00
[52] U.S. Cl. ..................... 434/350; 434/118; 434/323; 434/362; 273/432; 706/927
[58] Field of Search .................... 434/118, 169, 434/307 R, 308, 322, 323, 327, 334–336, 350–352, 362, 365; 273/429–432; 706/45, 927; 707/532

[56] References Cited

U.S. PATENT DOCUMENTS

| | | |
|---|---|---|
| 4,611,996 | 9/1986 | Stoner . |
| 5,035,625 | 7/1991 | Monson et al. . |
| 5,286,036 | 2/1994 | Barabash . |
| 5,295,836 | 3/1994 | Ryu et al. . |
| 5,385,475 | 1/1995 | Sudman et al. . |
| 5,395,243 | 3/1995 | Lubin et al. . |
| 5,597,312 | 1/1997 | Bloom et al. . |
| 5,727,950 | 3/1998 | Cook et al. . |
| 5,823,788 | 10/1998 | Lemelson et al. . |

OTHER PUBLICATIONS

"Success Maker Courseware," brochure, published by Computer Curriculum Corporation, Dec. 1994.

Active Mind Series from World Wide Web, URL = http://www.broderbund.com/studio/ams.html, 1996.

Logical Journal of the Zoombinis from World Wide Web, URL = http://www.broderbund.com/studio/atoz/zoombini.html, 1996.

Selecting Software by PC Novice Series, vol. 3, Issue 12, pp. 51, 64, and 89–92, 1995.

(List continued on next page.)

*Primary Examiner*—Joe H. Cheng
*Attorney, Agent, or Firm*—Peter Tong

[57] ABSTRACT

Providing methods and systems for a computer-aided group-learning environment, where a number of users can interact and work on a subject together. The system and method can monitor and analyze users' inputs. The analysis process can identify a user's performance on the subject, and can understand some of the user's traits, such as confidence level and learning attitude. The system can include an interaction controller, which sets a duration of time for the users to communicate in a dialogue environment. Working on the subject in a group and working alone can be intertwined. For example, the users first work on the materials generated individually, and then solve the problem together in a dialogue environment. During the dialogue session, the interaction controller can provide hints to the users. The system can also include a user registry, which restricts the users who can use the embodiment to work on the subject. The registry can receive potential user's characteristics to determine whether such user may be allowed to join the existing users to work on the subject. The registry can also access a summarized profile of the existing users to help the potential user make joining decisions. The system can also include a notepad for a user to take notes. The interaction controller can also guide the user to take notes.

20 Claims, 11 Drawing Sheets

OTHER PUBLICATIONS

Computerized Adaptive Testing, Oct. 24, 1994, from World Wide Web, URL = Gopher://Gopher.ETS.org.

Innovation and Technologies, Oct. 21, 1994, from World Wide Web, URL = Gopher://Gopher.ETS.org.

"Interactive Mathematic Instructor's Guide," by Academic Systems, pp. 86 and 114, Aug. 1995.

"High School Learning and Resource Library", by ProOne, photocopy of the box and screen–dump to get 5 pages, 1995.

The home page and a description of online training from a company named, Peritas. URL = www.peritas.com/noframes/home.html, and www.peritas.com/noframes/company/training/online/home.html, 1998.

A description on a product, Symposium, from a company named, Centra. URL = www.centra.com/product/index.html, and www.centra.com/product/sysreq.html, 1997.

Tutored Video Instruction: A Distance Education Methodology that Improves Training Results URL = www.cs.cmu.edu/afs/cs/user/jhm/15–601/tvi.html, Jun. 1996.

COMPUTER-AIDED GROUP-LEARNING METHODS AND SYSTEMS

This application is a continuation of U.S. patent application Ser. No. 09/015,653 filed on Jan. 29, 1998, now U.S. Pat. No. 6,029,043 and is incorporated by reference into this application.

BACKGROUND OF THE INVENTION

The present invention relates generally to learning, and more particularly to computer-aided methods and systems for a group of users to work on a subject.

The most common group-learning environment is a classroom. For thousands of years, knowledge has been conveyed in a classroom, with an instructor teaching a group of students. Such a group-learning environment has many benefits. For example, some students may be too timid to ask questions, though they do not understand. Such students will benefit from others who are not afraid to ask. When the instructor answers a question, many students benefit. While some students learn from the answer, others are encouraged they are not the only one who do not understand. There might even be students feeling superior over the student asking the question because they know the answer. Though such feelings should not be supported, they may motivate some students to learn. These types of psychological advantages of a group-learning environment should not be underestimated.

However, typically, there are too many students in a class. It is not uncommon to have students day-dreaming or even sleeping in class. The instructor just cannot cater to the needs of each student. Also, students in a class room are passive learners. They usually do not interact among themselves during class because information should flow from the instructor to the students, not among the students. With the instructor being the center of attention, students interacting among themselves may be considered as interrupting the instructor and disrupting the classroom atmosphere; those students might be reprimanded. Actually, there are instructors who do not even allow questions from the students.

Another learning environment is a small group of students actively interacting. A student who does not understand a certain area can be assisted by another student. With students interacting, encouraging and even criticizing each other, they are more alert than students in a typical classroom. Such an active interacting environment is more stimulating than the passive learning environment of a classroom.

Not only do students in such an active environment have better concentration, they typically have better understanding of a subject than the passive classroom students. By getting more involved, the students develop more insights in the subject. Also, no one person has exactly the same background and experience as another. During interaction, different students bring into the group different perspective, which can be enlightening.

A similar discussion environment with a lot of interaction is a chat room in the computer world. Members of a chat room typically share a common interest; it can be breast feeding a baby or biology. Usually, there is an initiator, who starts a session of discussion in a certain area within the common interest. Other members of that group respond. It is an environment where information is exchanged freely, in un-controlled discussions. Typically, the session ends when members lose interest. Though interesting, such chat room environments are not geared towards learning. It is more suitable for a group of members with similar interest to express their viewpoints, or exchange ideas.

In order for group discussion environments to be effective, the group should not be too big because a big group discourages interaction. However, a small group can end up gossiping, wasting a lot of their time. Another problem of a small group is that members have limited information. One benefit of a classroom environment is the presence of an instructor, who presumably should have much more knowledge in the subject of interest than the students. A group environment does not have that luxury. The group might get stuck in a certain critical area, and cannot proceed. Also, members might have diverse strengths and weakness. One member of the group might be much weaker than others. He might be left behind by the remaining members of the group, and ultimately drop out of the group.

Another environment to learn that is becoming more prevalent is learning through computers, which are gradually becoming an integral part of our culture. It is not difficult to include fancy audio-visual effects in the instructional materials. Such multimedia computer-aided learning systems can help some of us focus because they can create a lot of stimuli to our senses. Another benefit of computer-aided leaning is the immense amount of information available to the users. Not only do the users have access to harddisks with giga-bytes of information, they can surf the Internet and the World-Wide-Web for practically unlimited resources.

Many computer-aided learning systems that are tailored to the needs of individual students are also in development. Such methods and systems have been illustrated, for example, in the following allowed U.S. patent applications:

1. Methods and Apparatus to Assess and Enhance a Student's Understanding in a Subject, with Ser. No. 08/618,193;

2. A Reward Enriched Learning System and Method, with Ser. No. 08/633,582;

3. A Relationship-Based Computer-Aided-Educational System, with Ser. No. 08/664,023; and 4. A Learning System and Method Based on Review, with Ser. No. 08/675,391.

These systems and methods are quite intelligent, and very useful. They accurately identify, and offer solutions to, one of the main weaknesses of classroom education--an instructor cannot cater to the needs of each student. By focusing on the strengths and weaknesses of individual students, computer-aided learning systems can effectively teach, evaluate and reward users.

However, inherent in such computer-aided learning systems and methods is the unavoidable effect of working solely with a machine, not a living being. Until one day we have machines with artificial intelligence that is as sophisticated as a human mind, working with machines typically is not as interesting as interacting with another human being. Even then, we might still prefer to interact with our peers. To be ridiculed by our peers might generate more consequences—not necessarily productive—than to receive accolades from our computers. We usually prefer to have a certain degree of human touch.

It should have been obvious that there is a need for a computer-aided learning environment for a group of users, where they can interact and work on a subject together.

SUMMARY OF THE INVENTION

The present invention provides methods and systems for a computer-aided group-learning environment, where a number of users can interact and work on a subject together.

Not only can the invention include benefits of a personalized computer-aided learning system, such as learning materials tailored to users and large databases of information, the invention can also allow users to interact. A user working in such a group-learning environment is usually much more alert than working individually with a machine. Also, typically, it is more effective to solve a problem by a group than by a single person. Not only do different users bring into the group their different background, experience, knowledge and perspective, a group environment can help users concentrate.

In one embodiment, the invented system can monitor and analyze users' inputs, such as when they are interacting. This embodiment reduces the potential pitfall of users wasting too much time gossiping or distracted from the subject of interest because the system can be aware of such distractions. Also a weak user can be identified early on so that he can be separately taught to bring him up to speed with the other users. Such a weak user might be more motivated to learn in a group environment than in an individual learning environment because he might be ridiculed or ignored by other users due to his ignorance.

In another embodiment, the analysis process is not limited to identifying a user's performance in working on the subject, it is also applicable to understanding some of her traits, such as confidence level, and whether or not she has a good learning attitude.

One embodiment of the invention includes an interaction controller, which generates materials on the subject for the users, and sets a duration of time for the users to communicate in a dialogue environment.

To be aware of an end in a dialogue session helps the group focus, because if there is no end in sight, there is a higher tendency for users to wander aimlessly. In one embodiment, the interaction controller initiates and stops a dialogue session for users to communicate among themselves for the duration of time.

In one embodiment, materials generated for the users can be individually tailored to each user, who can access the materials separately from the other users. The interaction controller can also generate questions and tests to determine users' performance in working on the subject, and provide hints to help users solve problems.

Working on the subject in a group and working alone can be intertwined. For example, the interaction controller can generate materials on the subject for every user individually, and then select a problem for the users to solve. The users first work on the materials generated individually, and then solve the problem together in a dialogue environment for a duration of time. During the dialogue session, the interaction controller can provide hints to the users. After the duration of time, or before, if the users have resolved the problem sooner, the interaction controller can generate additional materials on the subject for the users.

In one embodiment, the system also includes an initializer, a performance analyzer, a recommendation generator, and a report generator. The initializer allows a user, such as an instructor, to set the subject to be learnt. The performance analyzer analyzes users' inputs to determine their performance, and attitudes, such as their participation levels and modes of participation in the dialogue sessions. The performance analyzer also can generate a summary of the users' performance to be stored for later retrieval.

Based on outputs from the analyzer, the recommendation generator produces recommendations, which can be used by the interaction controller to determine the materials to be generated for the users, and the way to present the materials to each of them. The recommendation generator can also produce information regarding each user's performance on the subject, and the effectiveness of the embodiment. It also can suggest what materials each user should individually work on.

The report generator can generate reports, such as on each user's performance to show what each user should be working on. The reports can also show each user's progress and the embodiment's effectiveness in helping users work on the subject.

Another embodiment of the invention further includes a user registry, which restricts the users who can use the embodiment to work on the subject. The registry can receive potential user's characteristics to determine whether such user may be allowed to join the existing users to work on the subject. The determination may be by an instructor, the embodiment itself, or the existing users. The registry can also access a summarized profile of the existing users to help the potential user decide if she wants to join. To further enhance the decision process, the registry can also provide the potential user temporary access to a dialogue session to communicate with the existing users. Moreover, the registry can forbid an existing user from using the system to work on the subject, based on recommendations, such as from an instructor or other users, or due to the user's consistently poor performance in working on the subject.

In yet another embodiment, the invention includes a user-profile storage medium, which stores each user's characteristics, such as his performance in working on the subject, and his input attributes, such as the percentage of his inputs that was related to the subject. In addition, all of the users' communication can be individually stored, and accessed.

Another embodiment of the invention includes a notepad for a user to take notes. The user can cut materials received by him, and paste them to his notepad; he can link an area in his notes to a point in the materials received from the embodiment, and bookmark certain parts of the materials for his notes. The interaction controller can also guide the user to take notes. This can be done, for example, by generating a summary of the materials for him; the summary can be in a topic format. The amount of details in the summary can depend on the user's performance in the subject, or can depend on an overall performance of all of the users. The interaction controller can also highlight sections of the materials that the user should take notes, where the highlighted portion can depend on the user's performance. The use of this notepad is not limited to a group-learning environment; it can be used by a user studying alone.

Other aspects and advantages of the present invention will become apparent from the following detailed description, which, when taken in conjunction with the accompanying drawings, illustrates by way of example the principles of the invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
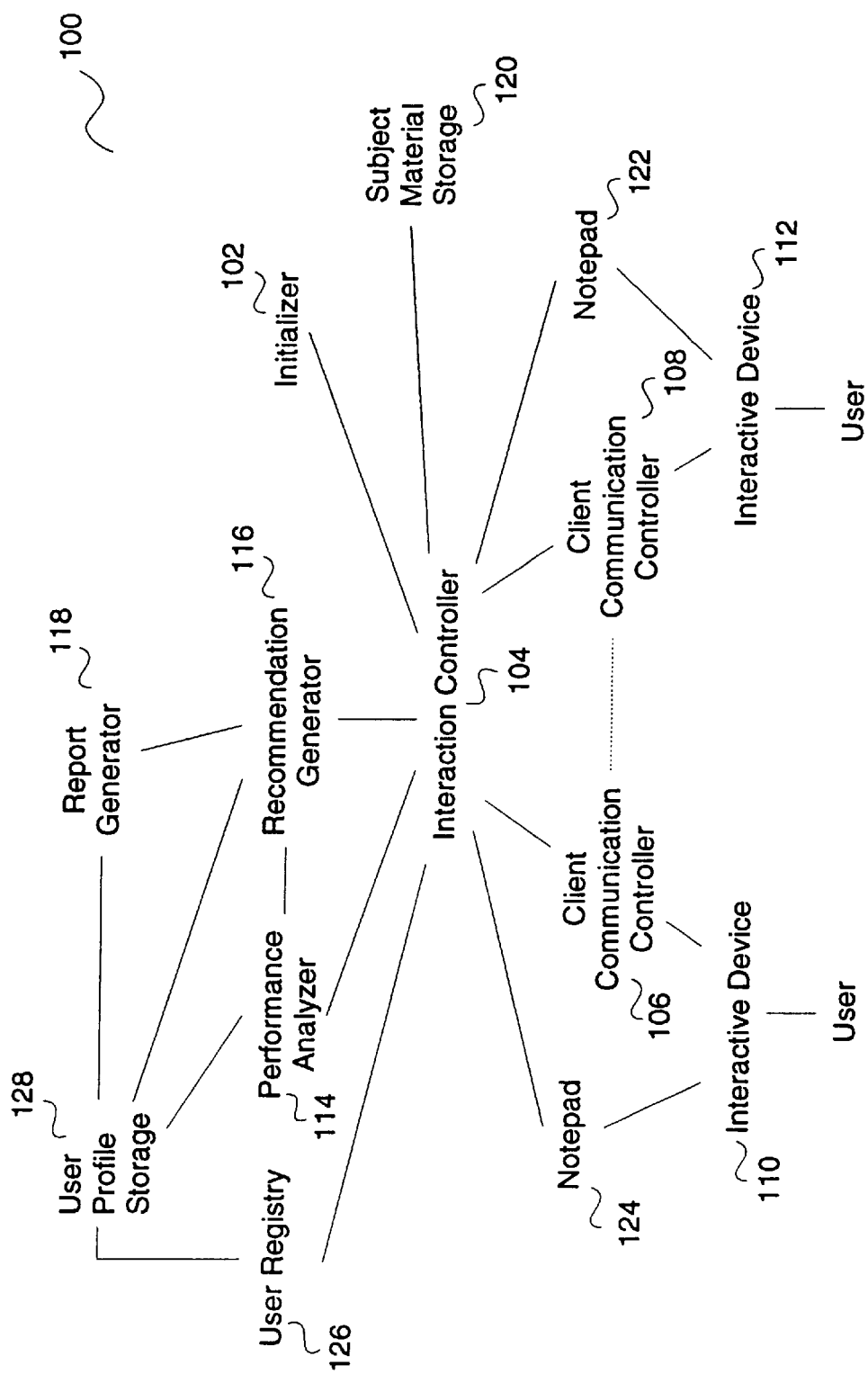
FIG. 1 shows one embodiment illustrating the present invention.

FIG. 1 shows a learning system 100 to illustrate one embodiment of the present invention for users to work on a subject together. It includes a number of elements. For example, an initializer 102 initializes the system 100, such as by setting the subject; an interaction controller 104 generates materials for the users to work on the subject, and monitors the users' responses; a number of client communication controllers, 106 and 108, take care of communication at the users' side; a number of interactive devices, 110 and 112, serve as the input/output devices delivering materials to and transmitting materials from the users; a performance analyzer 114 analyzes the users' responses monitored by the interaction controller 104; based on the analyses, a recommendation generator 116 generates recommendations to direct the interaction controller, such as recommending the materials to be generated; a report generator 118 generates reports; and a subject material storage medium 120 stores the materials on the subject.

The initializer 102 initializes the system 100, such as by selecting a subject to be worked on. In one embodiment, initially, the system can be used for many subjects. An instructor with his password can access the initializer to select one of them. In yet another embodiment, the initializer 102, by default, automatically selects a specific subject.

Each user accesses the system through an interactive device, which provides outputs to the user, and which receives inputs from the user. Different embodiments are applicable for the interactive device. In one embodiment, the interactive devices are monitors and keyboards, allowing users to enter their inputs through keyboards, and receive outputs on the monitors. The interactive devices can include digitizing boards to allow free-hand or graphic inputs. In another embodiment, the interactive devices include microphones and speakers to allow oral communication. Based on speech recognition hardware and software, which can be located in the interaction controller or the interactive devices, the communication can be converted to digital signals and interpreted. In yet another embodiment, the interactive devices include video cameras to allow users not only to be heard, but also to be seen, which might just include users' faces shown as icons on a part of a screen. The above embodiments can be mixed and matched. For example, one interactive device might include a keyboard, a monitor and a video camera.

In one embodiment, the interactive device is for the visual impaired, and includes speakers. In another embodiment, the interactive device is for the hearing impaired, and does not include speakers.

Figure 2:
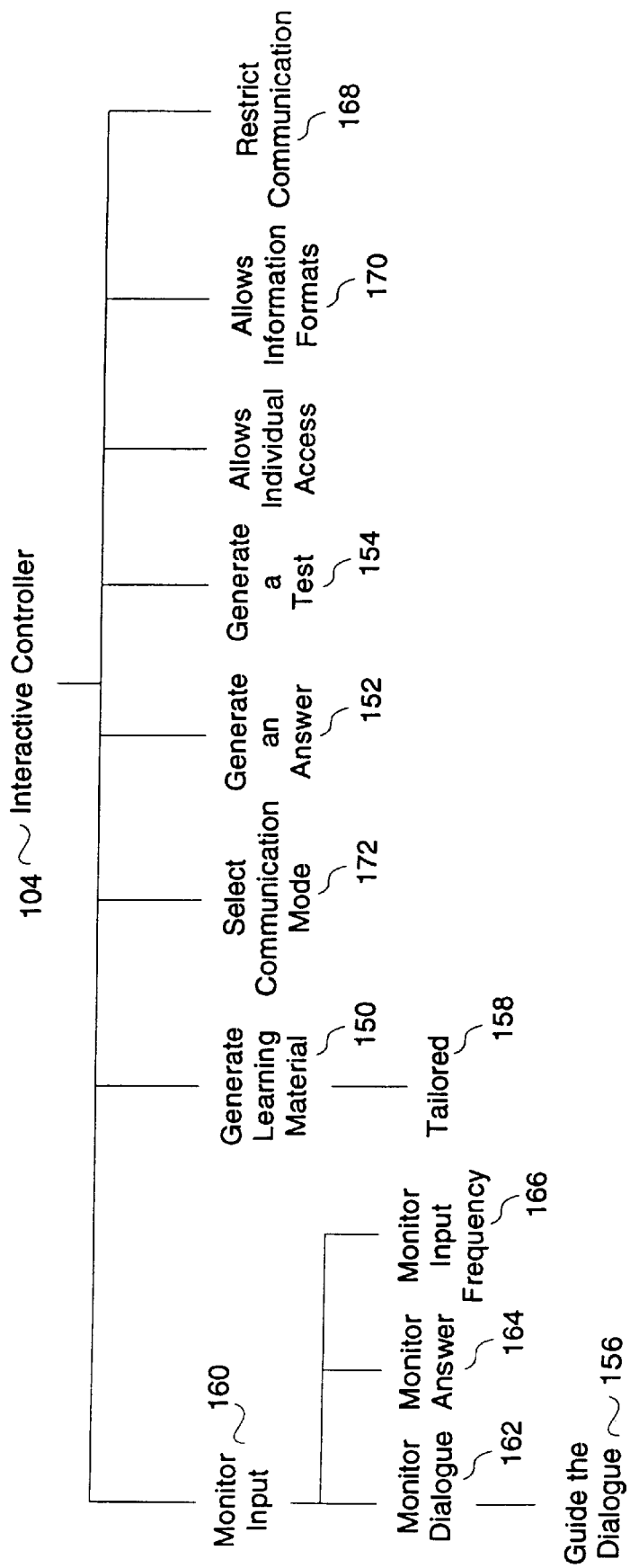
FIG. 2 shows one embodiment of a number of functions performed by the interaction controller of the present invention.

FIG. 2 shows one embodiment of a number of functions performed by the interaction controller. For example, the interaction controller generates for the users materials, which can be learning materials 150 on the subject, which can be tailored 158 to a user, an answer 152 to a question from a user, a test 154 for one or more users, and outputs to guide 156 users' dialogue, such as to warn a disruptive user, or a message to a user who has been communicating in areas unrelated to the subject for a pre-determined duration of time.

In one embodiment, materials can be previously stored in the storage medium 120. To generate the appropriate materials, the interaction controller can access them from the medium 120, and may assemble the materials into a format suitable for the users.

In one embodiment, the interaction controller also monitors 160 inputs from the users into the system, which can be:

the users' dialogue 162, the users' responses 164 to the interaction controller, such as answers from the users to questions from the interaction controller, the approaches a user employs to input materials into the system; for example, the amount of time the user interacts in a dialogue session; the frequency 166 and patterns of interaction, such as the duration of time of each interaction, and the time gap between two interactions; the numbers of questions the user asked the system, another user, and all users; the number of statements made; and the number of responses to questions asked by the system to the group.

In general, a client communication controller takes care of communication at a user end. In one embodiment, when a first user wants to transmit information to a second user, the first user's client communication controller is responsible for relaying information from its corresponding interactive device to the interaction controller, which can then relay the information to the second user's client communication controller. In this embodiment, client communication controllers are not directly coupled to each other, but can couple through the interaction controller.

Note that in this embodiment, the interaction controller can restrict, 168, one user from communicating with another user, such as by not transmitting messages between the users. Typically, the relaying has to propagate through a communication medium, such as a network. At the receiving end, the client communication controller can interpret information from the interaction controller, which might have received the information from another client communication controller. Interpretation can include formatting the received information for the appropriate interactive device to present the information.

In another embodiment, client communication controllers are directly coupled, as shown by the dotted line in FIG. 1. In this embodiment, if information is from a user's interactive device, the corresponding client communication controller first decides whether the information is for another user, or for the interaction controller. If it is for another user, the controller will send the information to the corresponding client communication controller of that user. Typically, information is also sent to the interaction controller to be monitored. If the interaction controller wants to restrict communication between two users, the interaction controller can send such a restriction command to the two corresponding client communication controllers. They can break the specific communication link between them. Similarly, if information is from the interaction controller or from another user's communication controller, the client communication controller is also responsible for interpreting those information, in ways, for example, as discussed above.

Figure 3:
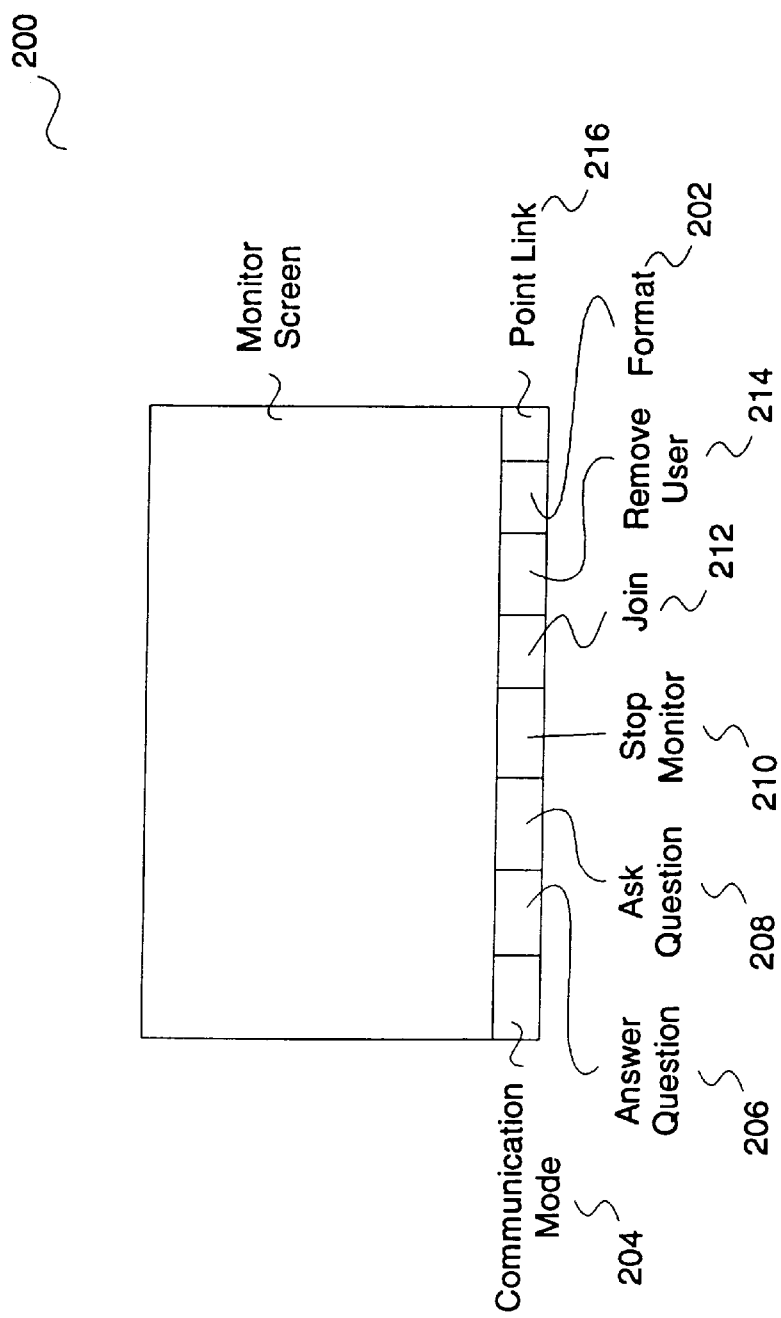
FIG. 3 shows one embodiment of a user interface for a user to indicate selections to the communication controller in the present invention.

In one embodiment, a user can decide the format to receive information. The user can, for example, transmit his desire through its interactive device to its communication controller. FIG. 3 shows one embodiment 200 of a user interface for the user to indicate his selections to the communication controller. That embodiment includes a monitor screen with a number of dialogue boxes at the bottom of the screen, and with one box designated for the format 202 of the information.

In one embodiment, the interaction controller is configured to allow the materials to be presented to the users in one or more formats 170. For example, the formats can be visual, as in text and pictures, or audio, as in speech, or audio-visual. The different formats can be mixed and matched, such as information with pictures and text can have the text presented orally, and pictures visually. A user can select one or more output formats to receive the materials by activating the format dialogue box 202, which will allow the user to pick the preferred format. The default mode is text and pictures.

In another embodiment, the materials for a user are presented in more than one format, and the user can select the sequence to receive materials in each format, again through the format dialogue box. If materials are in text and pictures, and if the user's interactive device has a slow connection—which can be due to the speed of the interactive device, or the connection between the communication controller and the interaction controller—the user can select the output format so that text is transferred first. Then, while he is reading the transferred text, pictures are slowly displayed on his monitor.

Information going to or coming from one interactive device does not have to show up in all of the other interactive devices. Different modes of communication can be set. For example, each user can determine the one or more recipients of his communication. If he only wants the system to receive his message, he can set his communication mode to a unicast mode—the mode where his communication goes to either the system, or the system with one user, which again is up to him to select. If he does not want all of the users to receive his communication, he can set his communication mode to a multicast mode—the mode where his communication only goes to a number of destinations, but not all. However, if he wants everyone to receive his communication, he can set his communication mode to a broadcast mode.

In one embodiment, a dialog box in FIG. 3 is labeled as Communication mode 204. If activated, the user will be given the following three choices: unicast, multicast and broadcast mode. If the user selects the unicast or the multicast mode, he will be given the names or pictures of the other users, and the interaction controller. He can then select the recipients of his message. Unless restricted otherwise, the interaction controller receives his message.

In one embodiment, just as users can control the recipients of their messages, the interaction controller can select 172 the communication modes for recipients of materials from the system. In other words, the interaction controller can decide if one or more users should receive materials from the system.

Another embodiment includes another mode of communication known as a uni-directional mode. If the interaction controller sets an interactive device through its client communication controller to be in such a mode, information will flow to that device, but not from that device to any other interactive devices. Inputs from that device can be received and monitored by the interaction controller, but not by other users. In other words, information flows uni-directionally.

To implement the different modes of communication, in the embodiment where the client communication controllers are not directly coupled together, the interaction controller maintains a separate communication session for each communication controller. When the interaction controller sends information to users:

In a unicast mode, through a communication session, information is sent to a communication controller;

In a multicast mode, through the communication sessions of a number of users, information is sent to those communication controllers; and In a broadcast mode, information is sent through all of the communication sessions to all of the communication controllers, and this can be done one at a time.

Similarly, if information flows from an interactive device, the information can first be sent to the interaction controller. The destination of the unicast mode depends on whether another user is the recipient, or whether the interaction controller is the recipient. If another user is the recipient, the interaction controller forwards the information to the destined user. However, if only the interaction controller is the recipient, the controller does not forward the information to any user. In the multicast mode, the controller forwards the message to the group of designated users. In the broadcast mode, the controller forwards the information to all of the sessions.

To implement the different communication modes in an embodiment where the communication controllers are directly coupled, the interaction controller can set up a point-to-multipoint (PMP) connection from each communication controller to each of the other communication controllers. The interaction controller can also set up an individual communication session with each of the communication controllers. In this embodiment, if the interaction controller wants a communication controller to operate in the unidirectional mode, the interaction controller will either not set up, or remove the already established, communication controller's PMP connection; that controller can only receive information, but cannot transmit information to other communication controllers.

In one embodiment, each piece of information contains an indicator indicating its destination. If information flows from the controller to one user in the unicast mode, the indicator indicates only one user; in the multicast mode, the indicator indicates the intended users; and in the broadcast mode, the indicator indicates all of the users. Similarly, for information from a user, there will be an indicator in the message indicating the recipient. Note that in the broadcast mode, the original sender of the information does not receive the message.

The interaction controller directs dialogue sessions, such as when to start and when to stop such sessions for interaction. This dialogue time period can depend on a number of factors, for example, the number of users and the issues to be addressed by the users. In the default mode, the time period is set to be fifteen minutes. In one embodiment, this period is set by a number of rules. Typically, the more complex the issues, the longer the time period. However, the interaction controller can take other factors into consideration. For example, the time period will be ten minutes if there are two users; and the time period will be fifteen minutes if there are four users. In yet another embodiment, the interaction controller sends a message to each user when the session is going to be over soon; for example, if the designated session is a fifteen-minutes session, then one minute before the end of the session, the interaction controller will tell the users to wind down because the session is going to end in one minute. In one embodiment, each interactive device has a counter, which shows the amount of time left in the dialogue session, as the users are interacting in the session.

When the interaction controller determines that the users should spend some time on an area of the subject in a dialogue environment, the interaction controller will start a dialogue session. There are a number of factors to consider when to have a dialogue session. Typically, after receiving materials from the interaction controller for a period of time, such as twenty minutes, the users might prefer to be involved in a dialogue session. Mixing and matching working on a subject by oneself and working with others can enhance concentration and comprehension level. There are other reasons to mix and match such different learning environments. For example, after the interaction controller has presented a concept, sometimes, it is beneficial for the users to discuss the concept together, or to work on a problem based on the concept. Such interaction can strengthen understanding and help users better remember what they have learn. In yet another example, it is sometimes beneficial for users to start learning a subject by discussing issues or trying to resolve a problem in the subject. In this example, users start working on the subject with a dialogue session. Designing such learning process—intertwining individual learning and group learning environments—should be obvious to those skilled in the art.

In one embodiment, to start a session, the controller sends a message to each of the users, telling them to start working on the area. Note that in the embodiment where users can interact among themselves without going through the interaction controller—the embodiment as shown by the dotted line connection in FIG. 1—the point-to-multipoint connections for each of the communication controller to the other communication controllers should already be in place. With the initiation from the interaction controller, the users can start working on the area together. As will be discussed, the interaction controller can start the session by posing a question for them to answer.

After the fixed period of time of interaction, or sooner, if the users have accomplished their designated mission earlier than scheduled, the interaction controller will terminate the discussion. This can be done by sending a message to each of the users indicating to them that the discussion is over. In one embodiment, if two users continue on discussing, the interaction controller can send them individual messages asking them to stop; or the interaction controller can restrict the communication between them in ways as discussed above.

During the dialogue session, the users can communicate through their interactive devices. For example, a user's inputs through his keyboard can be seen in another user's screen, or a user's voice can be heard in another user's speaker. Users can communicate in different modes, for example, in the unicast, multicast and broadcast mode. Users can exchange, for example, conversation through a microphone; text through keyboard inputs; drawings through a drawing utility, such as a pointing device or a digitizing board; and video images or non-verbal communication through a digital camera, or motion detecting devices.

In one embodiment, one user can passively observe inputs from other users, but other users cannot receive her communication. She is in the uni-directional mode of communication. She can be an instructor observing other users' progress in working on the subject.

If users input through voices, their voices can be digitized and interpreted through speech recognition mechanisms. If the inputs are through pictures, they can be analyzed and interpreted by image recognition hardware and software to identify different features. For example, one user is falling asleep if his eyes are closed and his head is pointing downwards for more than five seconds. In one embodiment, voice and image recognition can be performed in the interactive devices. This will reduce the amount of data traffic from the interactive devices to the interaction controller. In another embodiment, such recognition can be done at the interaction controller or the performance analyzer.

Figure 4:
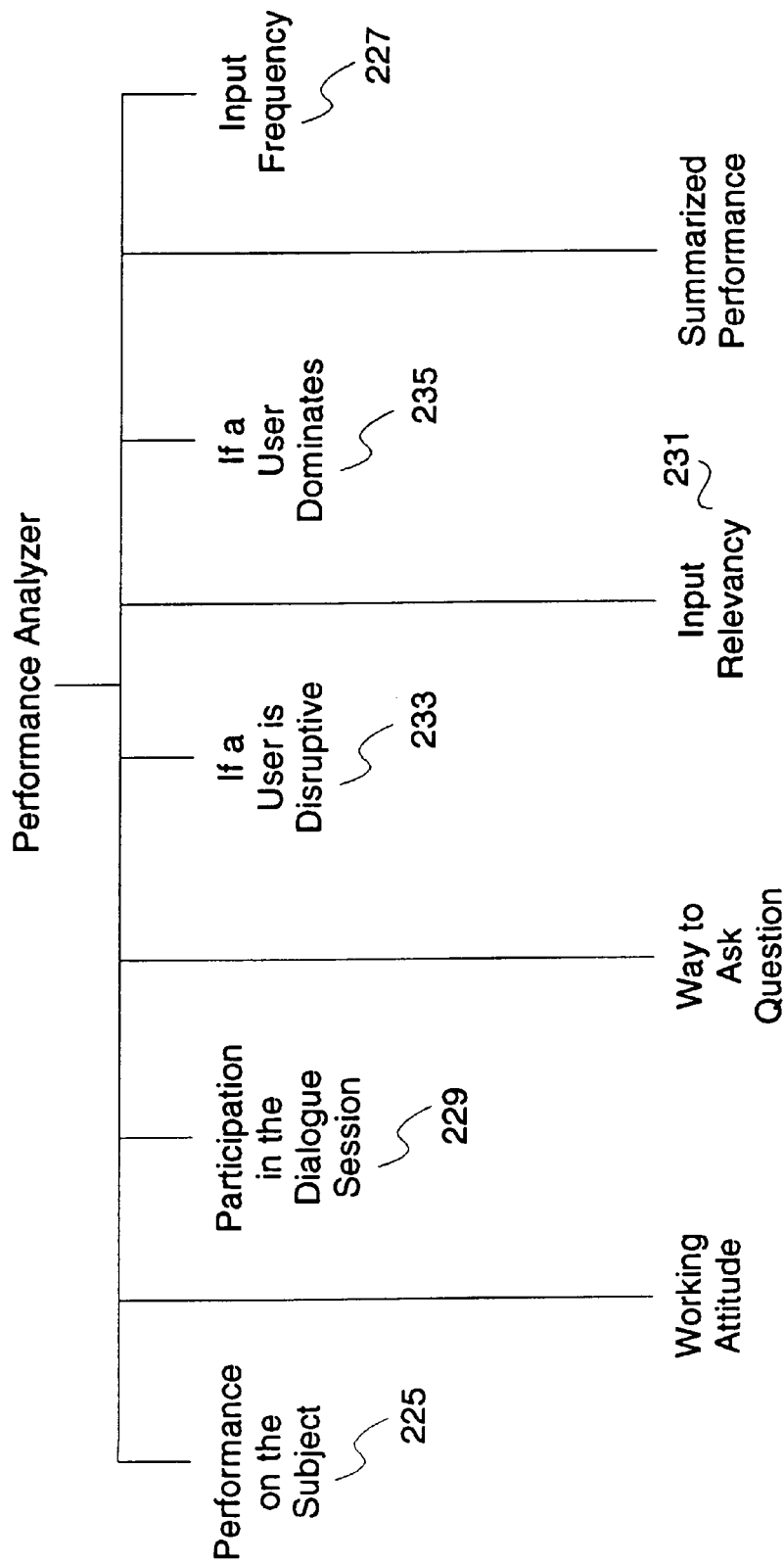
FIG. 4 shows one embodiment of examples of functions performed by the performance analyzer of the present invention.

In one embodiment, the performance analyzer 114 analyzes the monitored users' inputs, which can determine users' performance on the subject, and users' characteristics. FIG. 4 shows one embodiment of examples of functions performed by the performance analyzer 114. For example, the analyzer 114 can analyze a user's performance on the subject 225, his input frequency 227, his participation in dialogue sessions 229, and the relevancy of his inputs 231. Note that a user's inputs are not limited to his inputs during dialogue sessions because the user can input, such as ask questions, when materials on the subject are presented to him.

In determining a user's performance 225 on the subject, the performance analyzer can analyze the tests administered to the users, or the answers to questions presented to the users. Results from the analysis can determine the users' performance in working on the subject. There are many ways to generate tests and questions of varying scopes of difficulties, and to analyze their answers. Some have been taught in the allowed patent application, entitled, Methods and Apparatus to Assess and Enhance a Student's Understanding in a Subject, with Ser. No. 08/618,193, which is hereby incorporated by reference into this specification.

The analysis can be rule-based, where the rules can determine users' characteristics. Certain inputs by a user imply the user has certain characteristics.

Examples of such rules include:

A user interacts infrequently if he interacts less than 25% of an average user, which can be the average user of the group, or the average user among a number of groups using the present invention.

If a user interacts infrequently, the user is working on the subject passively.

A user interacts frequently if the user interacts more than 150% of an average user.

A user who is below the 15 percentile of the group in performance is very weak in the subject.

A user who is above the 85 percentile of the group in performance is very good in the subject.

If a user's inputs in a dialogue session have less than 25% relevancy to the subject, the user is not conducting a normal interaction.

If a user is not conducting a normal interaction and the user interacts frequently in a dialogue session, the user is disrupting, 233, the group during the dialogue session.

If a user often disrupts dialogue sessions, the user may not be a team player.

A user dominates, 235, a dialogue session if the user interacts more than 300% of an average user of the group.

If a user dominates a dialogue session, the user may have leadership characteristics.

If the group's inputs in a dialogue session have less than 25% relevancy to the subject, the group has been distracted from the subject.

Figure 5:
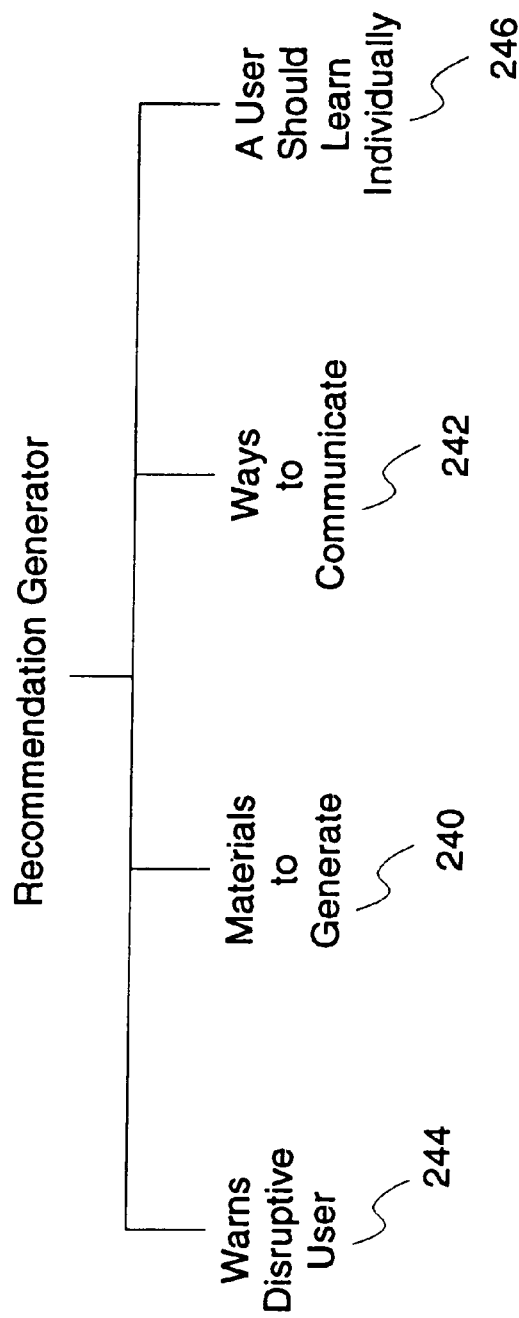
FIG. 5 shows one embodiment of examples of recommendations provided by the recommendation generator of the present invention.

The recommendation generator 110, based on the analyzed results, provides recommendations. FIG. 5 shows one embodiment of examples of recommendation provided by the generator. The recommendation can be for the interaction controller 102 to determine the materials to generate, 240, for the users. In one embodiment, the recommendation can be for the interaction controller 102 to determine the way to communicate, 242, to a user. The recommendation can also be used for generating reports on a user's progress. Again, the recommendation generator can be rule-based, and it can apply some of the rules of the performance analyzer. A certain analysis result can activate a certain type of recommendation.

Examples on rules for the recommendation generator include:

If a user is disrupting a session then the interaction controller
  warns the user, 244,
  asks if the user wants to terminate her session,
  if the user desires to end her session, terminates it and informs the remaining group.

The interaction controller asks a user who is very weak in the subject if he wants to
  leave the group,
  learn individually, 246, or
  consult an instructor.

If during the dialogue session, the group is distracted from the subject for a pre-determined duration of time, then the interaction controller guides the dialogue by
  suggesting the group to return to the subject in the broadcast mode, or
  asking the group a question in the subject, or
  asking if the group wants to repeat what they have just worked on, or
  asking if the group needs help in the area they are working on, and if so, suggesting the group to ask questions, or to repeat what they have just worked on.

Examples on rules that are directed to presentation approaches to a user based on the user's characteristics include:

Avoid asking a user who dominates a dialogue session any question.

If a user is working on the subject passively, then in the next available opportunity the interaction controller
  asks, in the broadcast mode, the user to answer a question, or
  suggests the user to work on his communication skill.

Based on information from, for example, the recommendation generator, the report generator 118 can generate different types of reports, such as one report showing what each user should work on, and another report showing the overall performance of the users, or the effectiveness of the system.

The storage medium 120 stores different materials on the subject. It can also store the users' overall performances.

In the above embodiments, for clarity, names are given to different elements to perform different tasks. However, it should be understood that the numerous tasks can be performed by other elements. For example, the performance analyzer can also generate recommendation, and reports.

Figure 6A:
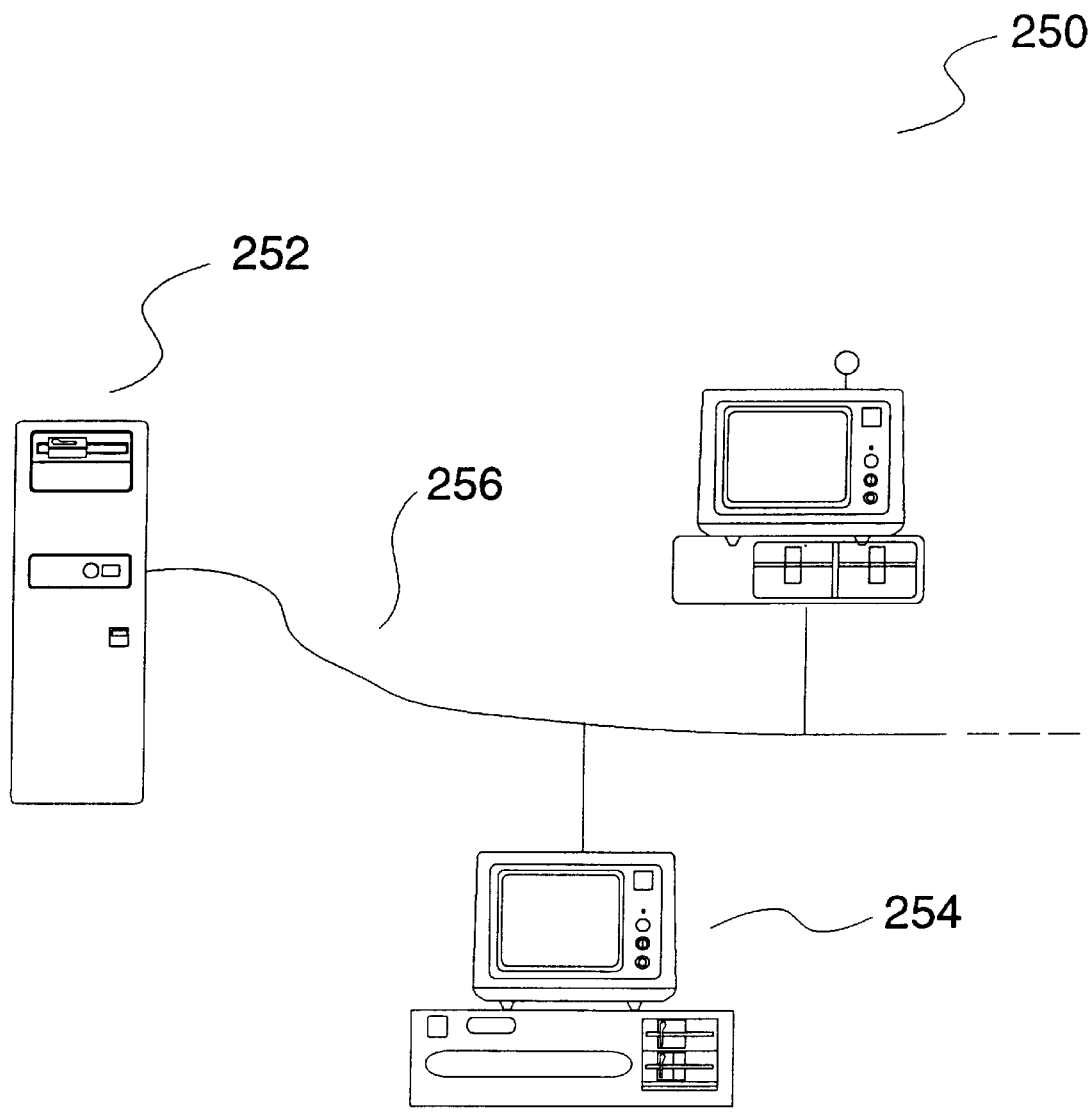
FIGS. 6A–B show a physical implementation for one embodiment of the present invention.

FIG. 6A shows one embodiment of physical implementation 250 of the invention, preferably in software and hardware. The embodiment 250 includes a server computer 252 and a number of client computers, such as 254, which can be a personal computer. Each client computer communicates to the server computer 252 through a dedicated communication link, such as an intranet, or a computer network 256, which can the Internet, the Web or other forms of networks.

Figure 6B:
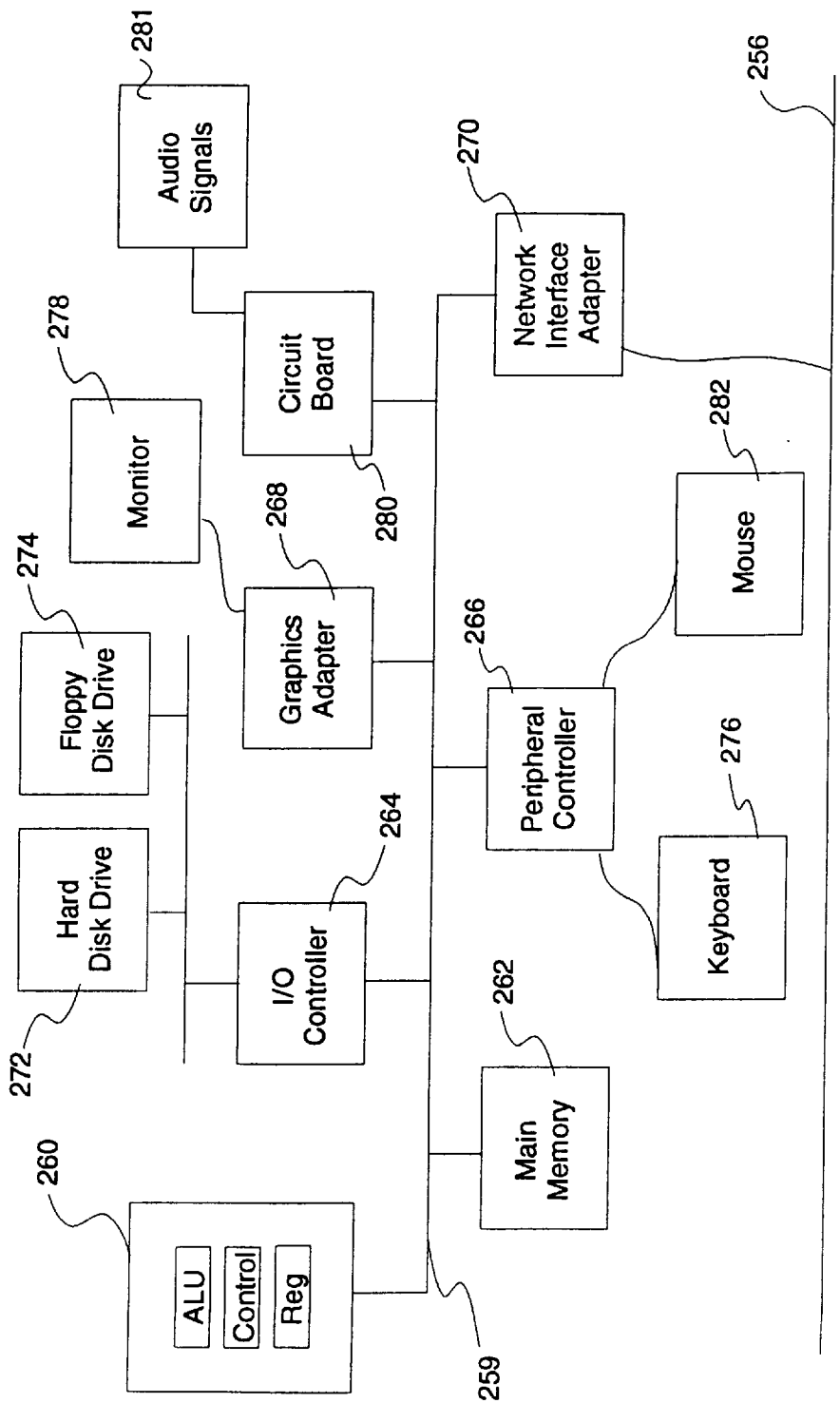

FIG. 6B shows one embodiment of a client computer 254. It typically includes a bus 259 connecting a number of components, such as a processing unit 260, a main memory 262, an I/O controller 264, a peripheral controller 266, a graphics adapter 268, a circuit board 180 and a network interface adapter 270. The I/O controller 264 is connected to components, such as a harddisk drive 272 and a floppy disk drive 274. The peripheral controller 266 can be connected to one or more peripheral components, such as a keyboard 276, a mouse 282, a digital camera and a digitizing board. The graphics adapter 268 can be connected to a monitor 278. The circuit board 280 can be coupled to audio signals 281 and video signals; and the network interface adapter 270 can be connected to the network 256. The processing unit 260 can be an application specific chip.

Different elements in the present invention may be in different physical components. For example, the initiailizer 102, the subject material storage medium 120, the recommendation generator 116, the performance analyzer 114, the report generator 118, and the interaction controller 104 can be in the server computer 252; while the interactive devices, 110 and 112, and the client communication controllers, 106 and 108, can be in client computers. In another embodiment, a part of the interaction controller 104 can be in the client computers. That part can be responsible for analyzing the monitored inputs so as to reduce the amount of information that has to be transmitted through the network from the client computers to the server computer.

Users can use the system 100 to work on a subject. In working on the subject, the users learn something about the subject together or individually. In one embodiment, the subject is a pre-defined problem, and the users are solving the problem. Through solving the problem, the users learn. Typically, learning from a subject and solving problems in the subject are intertwined. Note that the system is not restricted to a group-learn environment. A user can use the system to work on a subject individually.

In this invention, a subject to be worked on by users can be of varying scope of complexity, and can be in many different fields. In one embodiment, the subject is mathematics or history, or the JAVA programming language. In another embodiment, the subject is on methods to bake a custard pie. In yet another embodiment, the subject covers theories and techniques on selling houses, and the users can be real estate agents, with the learning sessions allowing the agents to network also.

The following is a detailed example to help illustrate the present invention. The subject is Mathematics, which can be divided, for example, into many topics and line items. A group of students or users are learning one of its topics. One major topic is the automata theory, and it can be divided as follows:

```
Major Topic: Automata Theory
    Minor Topic: Finite Automata (FA)
        Line Item:      Deterministic Finite Automata (DFA)
                        Non-deterministic Finite Automata (NDFA)
                        Equivalence of DFA and NDFA
    Minor Topic: Pushdown Automata
        Line Item:      Deterministic Pushdown Automata
                        Non-deterministic Pushdown Automata
    Minor Topic: Turing Machines
    Minor Topic: Church's Thesis
    Minor Topic: Languages
        Line Item:      Regular Expressions (RE)
                        Regular Grammars (RG)
                        Context Free Grammars
                        Context Free Languages
                        Context Sensitive Grammars
                        Context Sensitive Languages
    Minor Topic: Finite Automata and Regular Expressions (FA & RE)
        Line Item:   Properties of Languages Accepted by FA (P-FA)
            Sub-Line Item:  Union (P-FA-UNION)
                            Concatenation (P-FA-CONC)
                Equivalence Between FA and RE (FA = RE)
                Determining RE Accepted by a FA (FA => RE)
                Constructing a FA from an RE (RE => FA)
```

Leaning materials on the different line-items can be pre-stored in the storage medium 120. Generating such learning materials should be obvious to those skilled in the art, and will not be further described in this specification.

In this example, users learn in four three-hours sessions, the minor topic of Finite Automata and Regular Expressions (FA & RE), with each session covering a line item in that minor topic. For example, the first three hours are devoted to Properties of Languages Accepted by FA (P-FA), and the second three hours to Equivalence Between FA and RE. During the interim period between two three-hours sessions, users can access materials to learn individually.

A group of four users—Christine, Shirley, Joe and Tom—are learning together. They do not have to be located at the same place, as long as they are connected by a network. Assume that they have accessed their corresponding interactive devices, and are ready to work on the subject. In one embodiment where information goes through the interaction controller before the information is propagated to a user, each of the interactive devices has registered its address with the interaction controller. In another embodiment where the communication controllers can be directly coupled to each other, the interaction controller sends information to the four communication controllers to set up the point-to-multipoint connections.

Figure 7:
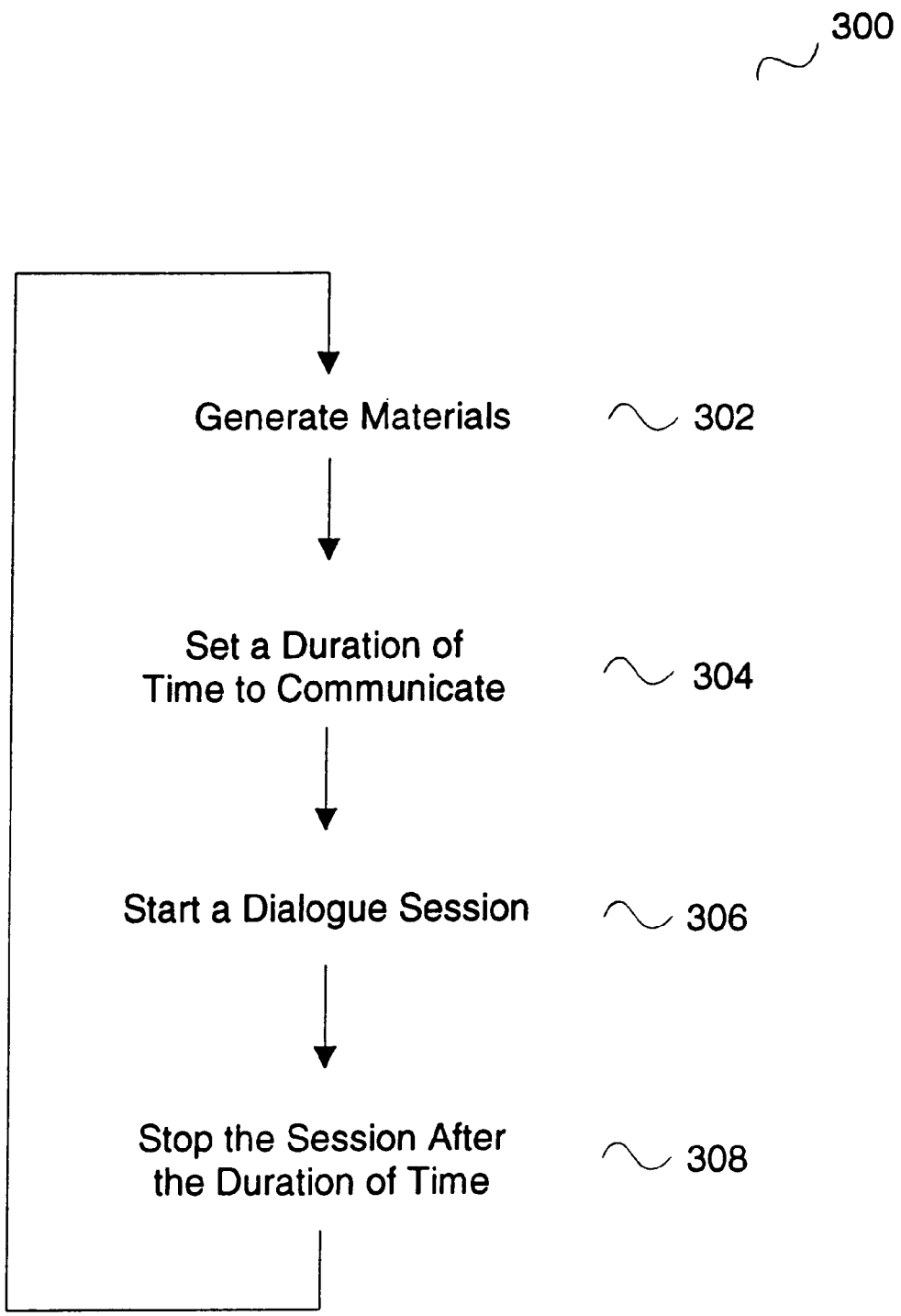
FIG. 7 shows one embodiment of one set of process to work on a subject for the present invention.

FIG. 7 shows one embodiment of a set 300 of steps for users to use the present invention to work on the subject. When the first session begins, the interaction controller 102 generates (step 302) materials, such as the Union property, to communicate to the users for them to work on the subject. Generating materials can take different forms. For example, generating materials can be retrieving materials from the storage medium; generating materials can be retrieving materials from storage and formatting them; and generating materials can be producing questions of varying scope of difficulties. Typically, the materials are related to the subject. In this example, the users are learning, for example, the Union property, which can be retrieved from the storage medium to be broadcasted to the users.

After broadcasting the basic concept of the Union property, the interaction controller 102 sets (step 304) a first duration of time, such as ten minutes, for the users to communicate in the dialogue environment. In this example, the topic of discussion is to answer a question generated by the interaction controller. This discussion period can serve many purposes, such as motivation, enhancing the understanding of the Union property, and testing the users' understanding. For example, the interaction controller presents a description of three finite automata FA1, FA2 and FA3 where FA3 accepts the union of languages by FA1 and FA2. The interaction controller further presents an expression EXP, and verifies that EMP is accepted by FA3. The question is:

Is EXP accepted by FA1, FA2, both or none?

The users can pick one of the following four choices as the answer:

FA1

FA2

FA1 and FA2

None.

In this example, the answer is FA1.

The interaction controller starts (step 306) a dialogue session. This can be done by presenting the questions to the users and asking them to solve it.

In one embodiment with interactive devices including monitors, and the user-interface as in FIG. 3, one dialog box is designated as Answer Question, 206. Activating this dialog box provides an indication to the interaction controller that one user would like to answer the question. The question with the four choices can re-appear on the monitor for selection.

If after discussing for five minutes, the users still have not responded with an answer, or if a wrong answered has been selected, such as (FA1 and FA2), the performance analyzer can send such information to the recommendation generator 116. The generator 116 can recommend that the interaction controller 104 should provide one or more hints in the broadcast mode to the users, such as the following:

Hint: The answer is either FA1 or FA2.

In one embodiment, another dialog box, as shown in FIG. 3, is designated as Ask Question, 208. If a user, such as Tom, activates this dialog box, he can ask a question. Again, Tom can ask the question in the unicast, multicast or broadcast mode. There are many different approaches for a system to respond to a question. A few question answering approaches are discussed in Appendix 1.

As the users progress, Tom asks the following question in the broadcast mode:

What is the Union Property?

The performance analyzer analyzes the question and determines an answer. In this embodiment, the interaction controller generates the answer by accessing or receiving it from the performance analyzer. The interaction controller also determines that the answer should be broadcasted. This can be based on the rule that if a user broadcasts his question, the interaction controller will broadcast the answer. The answer can be as follows:

If there are two finite automata, FA1 and FA2, accepting languages L1 and L2 respectively, and L=L1 U L2, then there is a finite automation accepting L.

Tom still does not understand. This time he asks:

What does L1 U L2 mean?

But this time Tom asks in the unicast mode, and transmits his question to the interaction controller only. The interaction controller generates the material to respond, and determines to respond in the unicast mode.

In one embodiment, instead of the system generating responses to Tom's questions, an instructor, in a unidirectional mode, observes the users' progress. When Tom asks the question, the instructor overrides the system, and generates a response for Tom.

The overriding function can be done in a number of ways. For example, when the instructor starts using the system, the instructor indicates to the system his special status. If the instructor wants to answer Tom's question, there can be a dialogue box in the instructor's monitor, which gives the instructor such an option. When the instructor activates that dialogue box, the interaction controller will select the instructor's response for Tom's question.

In one embodiment, users' communication during a dialogue session is not monitored, or at least a portion of the communication is not monitored. In some situations, monitoring the users can change the dynamics of the users' interactions, if they know that they are monitored. In another embodiment, the users can stop the system from monitoring, for example, by activating the dialog box at the bottom of the screen, labeled, Stop Monitor, 210. In this mode, the users can still communicate among themselves, except that the interaction controller stops monitoring their communication.

With users' inputs monitored, the performance analyzer analyzes them, such as analyzing the content of each user's input, the communication process, including how often each user communicates, and the mode of communication used—unicast mode, multicast mode, or broadcast mode.

In one embodiment, the performance analyzer determines the relevancy of the users' inputs in the dialogue session. This can indicate, for example, if the users have been gossiping for a long period of time. If, for a pre-set period of time during the dialogue session, such as five minutes, the four users do not seem to be communicating on the subject, the interaction controller can send a message to at least one of the users. The message is for guiding the discussion back to the subject. In the present example, the message can simply be:

Is the problem solved yet?

The interaction controller can broadcast the message to all four users.

One way to implement this relevancy test is to have a number of words related to the subject, for example, five hundred words, pre-stored in the storage medium. Examples of such words include:

DFA, NDFA, deterministic, finite, automata, equivalence, pushdown, expressions, grammars, union, and concatenation.

If during the pre-set period of time, the performance analyzer decides that all four users have not used any of the five hundred words, the analyzer will conclude that the users have been distracted, and provide such an indication to the recommendation generator. The recommendation generator will recommend the interaction controller to broadcast the above message to guide the users back to the subject.

Another way to decide whether a user, such as Joe, has not been distracted is to calculate the percentage of relevancy of his inputs in the dialogue session. This can be done based on the following rules:

A sentence having one or more of the subject-related words is a relevant sentence.

Every word in a relevant sentence is a relevant word.

If (all relevant words)/(all words communicated by the user)*100<20%, the user has diverted his attention away from the subject.

The above calculation can be modified. One approach is to remove all of the obviously unimportant words from the communication, such as articles and auxiliary verbs, before performing the calculation.

A user can disrupt a dialogue session if he communicates frequently, and if his communication has a relevancy percentage of less than, such as, 20%. One way to implement this rule is to include a dictionary of words for each line item. To determine if there has been disruption, a relevant sentence is a sentence that includes one or more words in the dictionary of words of the current and previous line items. Every word in a relevant sentence is relevant.

The relevancy percentage=(all relevant words)/(all words communicated by the user)*100.

In another embodiment, a user is considered disrupting a dialogue session if his communication has little relevancy to other's communication in the session. One way to analyze the relevancy of Tom's response to Joe's communication is to create a temporary dictionary of words from Joe's inputs. This dictionary can be generated by first extracting every word in Joe's inputs. Then remove from the extracted words, all of the articles, prepositions and all forms of the verb to be. For the remaining words, generate the common synonyms of every word. This set of words is grouped together to form the temporary dictionary. If every word in Tom's response cannot be found in this temporary dictionary, Tom's response has no relevancy to Joe's communication. In one embodiment, in a session, if 80% of Tom's response has no relevancy to the communication Tom is responding to, whether the communication is from the system, or from another user, then Tom is considered disruptive to the session. In another embodiment, the temporary dictionary is generated from all of the communication made in a specific time frame, which can be between Tom's input prior to the most recent response and Tom's most recent response; note that between Tom's two responses, one or more other users have communicated. Tom is considered disruptive if Tom's input relevancy is less than 20% in this time frame.

In one embodiment, the performance analyzer 114 can also analyze other traits. For example, during interaction in the dialogue environment, compared to other users, Shirley rarely communicates. The performance analyzer 114, based on a set of rules, determines that Shirley probably is not an extrovert. An example of such rules is as follows:

(1) Ave_Com=The average amount of time the four users communicate.

(2) If (the amount of time a user communicates)/Ave_Com<0.25, then the user is not an extrovert.

On the contrary, if during the dialogue session, Shirley communicates three times more than others, Shirley is considered to have dominated the dialogue session.

In another example, if, for more than 80% of the time, when Tom asks the system or another user questions on the subject, he asks in the unicast mode, instead of the broadcast or the multicast mode, the analyzer 114 determines that Tom's confidence level in the subject may be low. This rule requires distinguishing a statement from a question. One way to perform such a determination approximately is by rules such as the following:

A sentence that starts with a noun phrase is a statement. Such language interpretation techniques can be found, for example, in Natural Language Understanding, written by James Allen and published by Benjamin Cummings.

After the users have resolved the problem presented by the interaction controller, or after the allocated time for the dialogue session, whichever is earlier, the interaction controller terminates (step 308) the dialogue session. This can be done, for example, by sending such a message to each of the users, telling them that the dialogue session is over. Also, the interaction controller can stop relaying information among the corresponding communication controllers, or can ask each communication controller not to relay information to any other communication controllers.

After termination, based on the determination by the recommendation generator, the interaction controller can generate materials for the users, and let the users communicate in another dialogue session. The steps shown in FIG. 7 can be varied, for example, the first step can be setting a duration of time to communicate.

Assume that the next area to be taught is Concatenation (P-FA-CONC). Prior analysis by the performance analyzer 114 indicates that Tom is weak in P-FA-UNION. In one embodiment, to help Tom catch up, the recommendation generator determines that the materials for Tom should be simpler. One set of materials on P-FA-CONC will be sent in a multicast mode to Christine, Shirley and Joe; and another set of materials will be sent in a unicast mode to Tom.

As discussed above, the interaction controller 102 can generate materials tailored to individual needs. This can be done, for example, by having a number of sets of materials on each topic in the storage medium 120.

In one embodiment, materials having different difficulty levels for different users occupy similar presentation time. The different materials should not affect the different users significantly in their later dialogue sessions. In one embodiment, a user who is more knowledgeable in a line-item receives more questions on the line-item, with the additional questions being more difficult and covering more subtle concepts. In another embodiment, a weak user receives less complicated materials, or materials that do not cover certain sophisticated areas, or materials with more details on simple concepts. As an example when a weak user is learning how to differentiate, he will not be taught the theory behind differentiation, while the strong user will.

Using concatenation as an example,

First, define the Concatenation property: the class of languages accepted by FA is closed under concatenation. If there are two FAs, FA1 and FA2, accepting languages L1 and L2 respectively, and L=(L1 concatenate L2), then there is an FA accepting L.

More complicated materials means when presenting examples on the property, a more complex FA1 is used. For example, a more complex FA has more final states than a simpler FA A weaker user can receive more details explaining the concept of concatenation.

Generating such learning materials should be obvious to those skilled in the art, and will not be further described here.

In one embodiment, to conclude the first session, the interaction controller generates a test on the subject. This can be done, for example, by the interaction controller accessing the test from the storage medium. The test is broadcasted to Christine, Shirley, Joe and Tom, for them to answer individually. Their answers help determine their progress in learning the subject. The test may include a number of multiple-choice questions for the users to answer.

After the users have answered the questions in the tests, each of them sends the answers to the interaction controller in the unicast mode. The performance analyzer again analyzes the answers received. Based on the test results and the analyses on prior inputs, the performance analyzer determines each user's performance, and some of their traits. For example, if Christine is very good in prior performances, but has very low score in the test, the performance analyzer may conclude that Christine understands the subject, but does not perform well under pressure.

At the end of the first session, based on the analyses performed by the performance analyzer, the recommendation generator suggests that Joe and Shirley should spend some time on the Union property before the next session. The recommendation generator may also suggest the other users to work on certain areas if they want to further improve on their understanding in the subject. These materials can be individually accessed after the first session.

In between the first and the second sessions, Shirley, through her interactive device, gets materials from the interaction controller. Appropriate materials on Union property are generated for Shirley. These materials can be tailored to her weaknesses so as to raise her understanding to a level similar to other users of the group.

Though Shirley has worked on the subject during the interim period, Joe has not.

At a pre-determined time, Christine, Shirley, Joe and Tom again gain access to their interactive devices, and the second session starts. This session is on Equivalence between FA and RE (FA=RE). The interaction controller starts the session with a dialogue session on the topic.

During the dialogue session, Joe is very passive. Based on the lack of response from Joe and based on Joe's previous poor performances, the performance analyzer determines that Joe may not have a positive learning attitude. One such rule is as follows:

If (a) a user is weak in a subject, (b) the interaction controller suggests the user to work on the subject individually, (c) the user has not worked on the subject individually using the system, and (d) the user remains weak in the subject, then the user may not have a good or positive learning attitude.

The performance analyzer conveys such information to the recommendation generator. The recommendation generator, based on another set of rules, determines if Joe should work on the subject individually. An example of such rules is as follows:

if (a) a user is weak in a subject, and (b) the user does not have a good learning attitude, then ask the user in the unicast mode:

(a) Do you want to learn individually, instead of in a group?

If the answer is yes, then (a) log the user out of the dialogue session, and (b) in the unicast mode, provide learning materials to the user.

At the end of the fourth session, in one embodiment, performance and trait information on individual users are not kept. However, the performance analyzer generates a summary of the performance of the group in learning the subject and stores the summary in the storage medium. One such summary may be as follows:

The four users should have understood the Union property.

Based on the analyses by the performance analyzer, the recommendation generator can generate a number of recommendations, for example, When the four users access the system again, the system should start teaching Regular Grammar.

In one embodiment, the report generator, based on information, for example, in the recommendation generator, generates a report for each user indicating what they have learnt, with their strengths and their weaknesses. The report can also indicate a user's attitudes that should be encouraged or discouraged. For example, the report might indicate that Joe should be more enthusiastic with his work, and should improve on his learning attitude. These reports can be for the users, or for the users' guardians.

The report generator can also show all four users' overall performance and the system's effectiveness. For example, at the end of each session, there can be a test for each user. Based on the test performance between sessions, the report can show how much the users, as a group, have improved.

User registry

Figure 8:
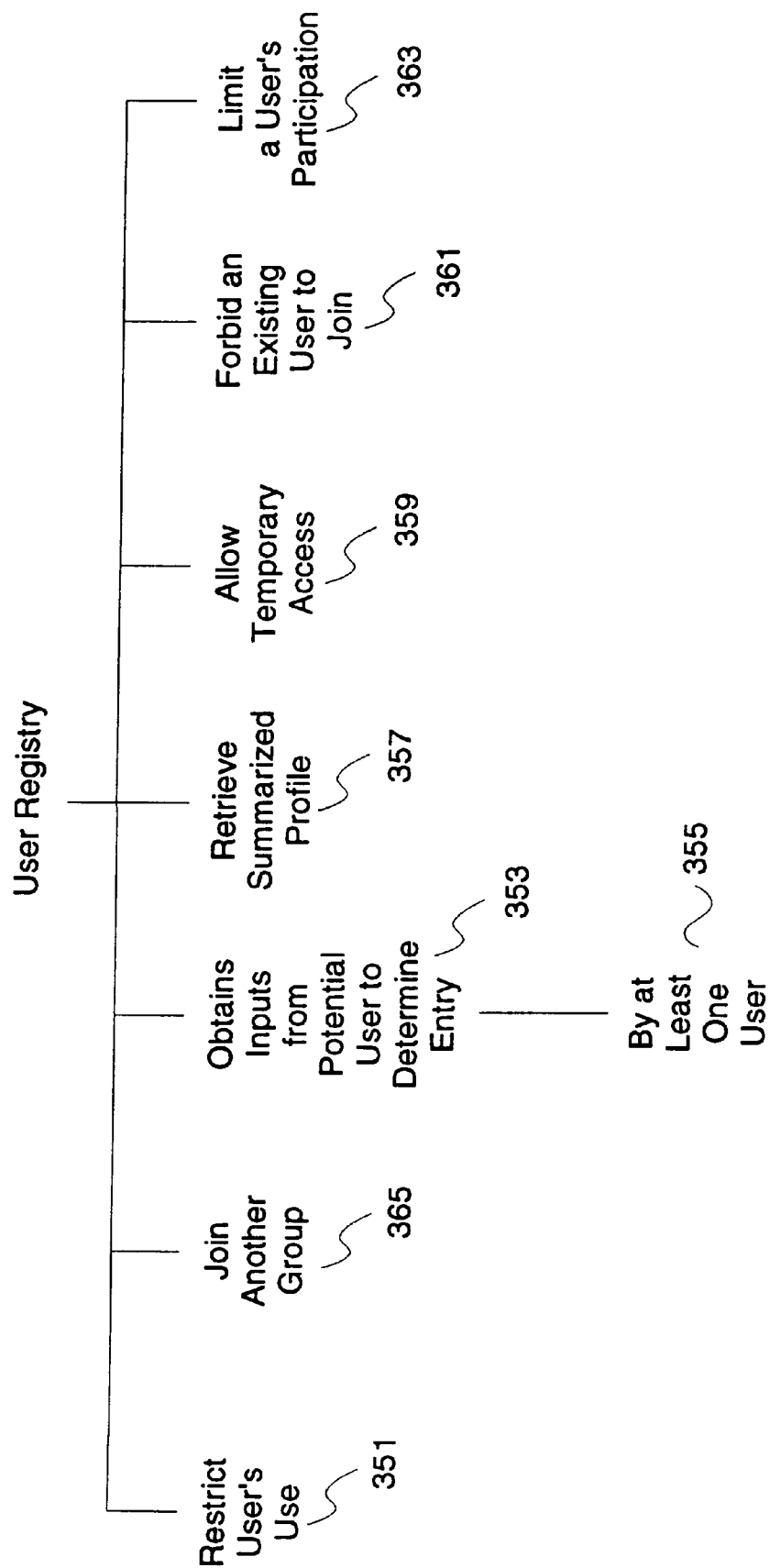
FIG. 8 shows one embodiment of some of the functions performed by the user registry of the present invention.

One embodiment of the system includes a user registry, with FIG. 8 showing one embodiment of some of the functions it performs. The registry restricts users, 351, to use the system to work on the subject, or serves as a gatekeeper restricting users who can use the system to work on the subject.

In one embodiment, each user has a key to get into the system. The key can be a password, a fingerprint, the image of a pupil, a signature, or other biometric characteristics of the user. Based on an appropriate peripheral device, typically with its corresponding software, the user registry 300 recognizes and authenticates a person's key based on a set of pre-stored keys in the system. If authenticated, she is allowed entry into the system.

In one embodiment, the user registry also determines entry of new users. Any person accessing the system will be asked if she is a potential or an existing user. Assume that a potential user, Lisa, would like to access the system. She responds to the user registry's question that she is a potential user. The user registry will try to obtain, 353, from her some information by asking her to provide, for example, (a) name, (b) age, (c) the schools graduated from or attending, (d) the subject interested in working on, and (e) other pre-requisites she has learnt. The user registry may also ask her to submit one of her recent pictures, through a scanner or an appropriate interactive device, such as a camera. If she is admitted, her picture can be seen by other users; for example, her picture can be an icon on the screen of a monitor, if the interactive device includes a monitor.

In one embodiment, the system provides Lisa with an entrance examination. The test can be subject-dependent and pre-stored in the system. The test results affect whether Lisa may join the existing users to work on the subject.

After the user registry has obtained her information, in one embodiment, an instructor decides on her entry. For example, the instructor can receive her information in an electronic mail, and then access the system. His key indicates his instructor status, which allows him entry to the key storage area of the user registry. If the instructor allows Lisa to join, he can add Lisa's name into the key storage area, and activate the log-in process for Lisa. Next time when Lisa accesses the system, it will invite her to join and ask her to enter a key, which will become one of the pre-stored keys.

If the instructor decides not to admit Lisa, he will so indicate to the user registry, which will send a rejection response to Lisa next time when she tries to access the system.

In another embodiment, one or more of the existing users determine, 355, if Lisa is allowed to join. Christine, Shirley, Joe and Tom will receive her information, which again can be through electronic mails. They can then access the system and discuss in a dialogue session whether they would like her to join. In one embodiment, one dialog box in FIG. 3 is labeled, Join, 212. After the discussion, one of the users can activate that dialogue box to give a recommendation as to whether Lisa should join.

In one embodiment, Lisa may ask the user registry to provide her with a summarized profile of the existing users. The user registry can retrieve, 357, such a profile from the storage medium. The summarized profile can include information, such as the number of users, their average age, their average education, what they have worked on so far, and their summarized performance. Their summarized performance can include the following:

They should be familiar with Regular Grammars.

The best user is familiar with Context Free Grammars.

Such information helps Lisa decide if she wants to join the group of users to work on the subject.

In yet another embodiment, Lisa is allowed temporary, 359, access—such as twenty minutes—to a dialogue session to interact with, for example, the instructor or the existing users. She may ask them questions, and vice versa. This again will help her, and the users or the instructor, decide whether she should join.

In another embodiment, Lisa is allowed to join, but not as a full user. Lisa's participation is limited, 363. She is only allowed to observe (not explicitly shown in the figures), but she cannot respond. She is allowed access in the uni-directional mode.

In one embodiment, after admission, based on the information she has submitted to the user registry, if the system decides that she is slightly below an average user, the system may generate materials for her to work on individually. Until she has caught up with the average user, as shown, for example, by the results of a test administered to her, she will not be allowed to join the group to work on the subject.

In one embodiment, the user registry can forbid an existing user, such as Christine, from joining, 361, one or more other users to use the system to work on the subject, such as by not sending her materials. The user can be asked to leave. For example, if one of the users, such as Tom, is extremely weak as compared to the other users, the recommendation generator might suggest that Tom should leave the group. This information is then transmitted to the user registry. In one embodiment, based on the information, the user registry removes Tom's key from the set of pre-stored keys of allowed users, which will restrict him from future entry into the system. In another embodiment, the interaction controller can stop sending information to Tom, and can forbid Tom from joining future dialogue sessions. In yet another embodiment, Tom's name or social security number or other biometric information may be stored to prevent Tom from using the system into the future.

In one embodiment, an instructor or the existing users can restrict Tom's future access. The instructor again can access the key storage area to remove Tom's key. In one embodiment, the existing users can activate a dialog box, labeled, Remove User, 214, as shown in FIG. 3. The system, based on such an activation, for example, will ask the user activating the box to name the user whom she wants to remove. After the indication, the rest of the users, except the one who might be removed, will be asked to vote on that user's removal. In one embodiment, if more than 75% of the users agree to remove him, he will be removed.

In yet another embodiment, the user registry can also suggest an existing user, such as Christine, to consider joining another group, 365. In this embodiment, the system includes information of summarized characteristics or performance of a number of groups. If Christine's level is much higher than those of the existing group, and if Christine's level matches a second group, the user registry can suggest Christine to try register for the second group. If Christine agrees, she will repeat the process of registration to see if she wants to or if she is allowed to join that group. Similarly, if Christine is asked to leave, the user registry can suggest Christine the groups she should consider joining.

The user registry can be used by a single user working on the subject individually. In one embodiment, the system includes the user registry restricting one or more users to use the system to work on the subject individually. In this embodiment, the interaction controller does not set up any dialogue sessions; for example, it can either not set up, or remove the already established, communication controller's PMP connection. The interaction controller can generate materials for a user, and monitor his inputs to the system, such as by asking him questions, and monitoring his answers. Users can use the system to work on the subject. However, users cannot use the system to communicate with other users. Similarly, a potential user can ask for summarized performance of existing users or other system or user information, but cannot have any dialogue session with existing users.

User-profile storage medium

Figure 9:
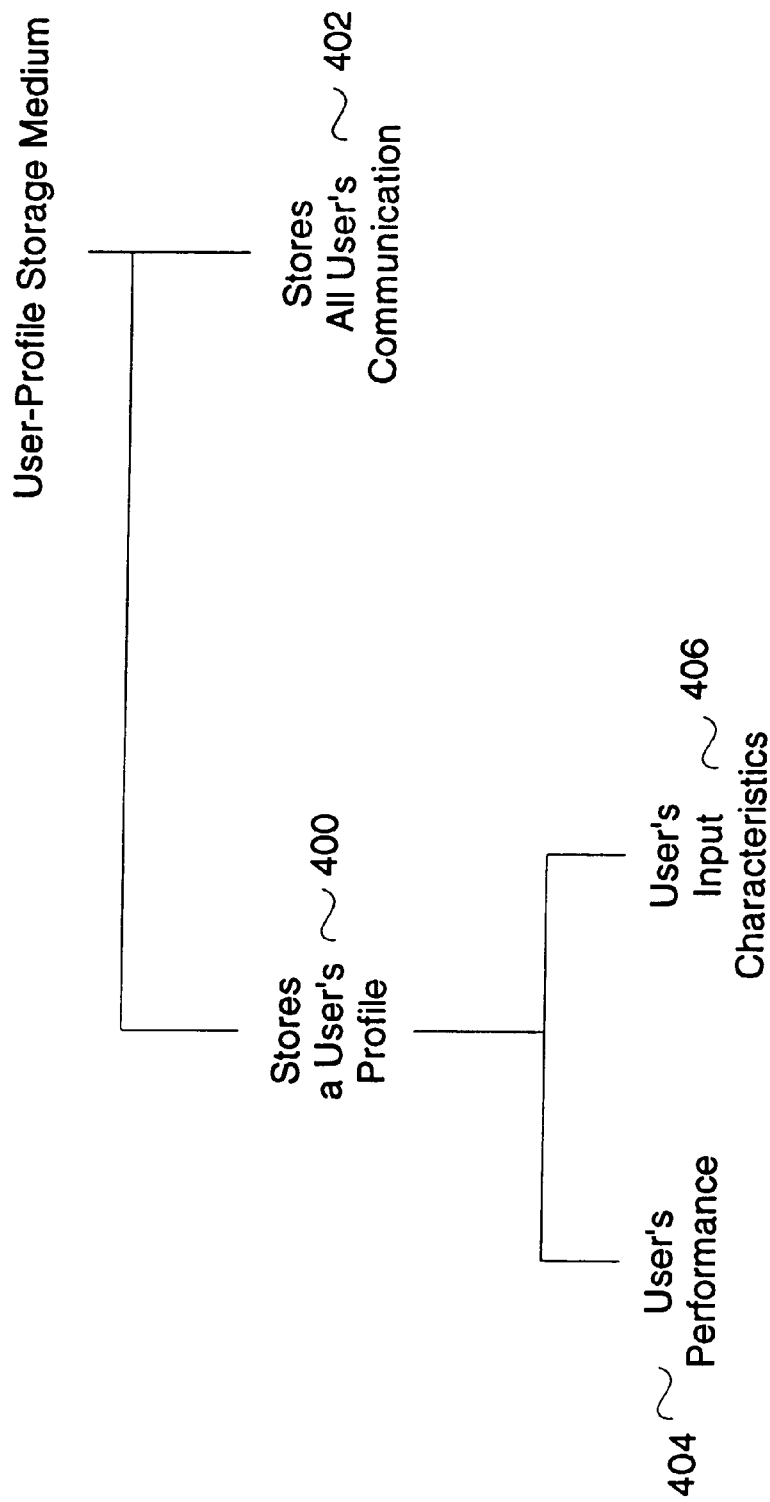
FIG. 9 shows one embodiment of some of the functions performed by the user-profile storage medium of the present invention.

In another embodiment, the system includes a user-profile storage medium, with FIG. 9 showing one embodiment of some of the functions it performs. The user-profile storage medium can store, among other materials, at least one user's profile, 400. For example, in one embodiment, the storage medium 128 stores the user's personal information, such as his name, age, the performance analyzer's analyses on the user's performance and traits, and the recommendation generated by the recommendation generator on that user. Reports on that user can be generated from information in the user-profile storage medium 128.

In one embodiment, the medium 128 stores a user's input characteristics, 406, such as the percentage of his input that is relevant to the subject, the amount of time he has communicated relative to others, and how often he has communicated in the unicast mode to the interaction controller as opposed to the broadcast mode. The medium can also store a user's performance, 404, in working on a subject, for example, his test scores, and the accuracy of his responses to questions.

The medium 128 can also store a summarized profile of a group of users, which can include all of the users. The summarized profile includes a summary of the profiles of the group of users. The group of users may be identified by a code-name, for example, Christine, Shirley and Joe, as the Magnificent Three. The summarized profile can be the profile of the Magnificent Three.

In one embodiment, the medium also stores the communications of all of the users, 402. The communication can be stored individually. In one embodiment, each user's communication may be accessed by that user, but not other users. In another embodiment, each user's communication may be accessed by other users also. For example, to verify Christine's prior admission of her ignorance in F-PA-UNION, Tom can access Christine's prior communication to search for her admission.

In one embodiment, the user-profile storage medium is separated into a private and a public sector. The public sector (not explicitly shown in the figures) can be accessed by any person, such as a potential user, while the private sector can be accessed only by those with specific keys. For example, an instructor, with her key, can get into the private sector, which can store information such as each user's individual performance in a subject.

As a user spends more time with the system, information gathered on that user becomes more detailed, which provides better understanding on that user. For example, if independent of subjects, Tom always asks questions in the unicast mode to the interaction controller, and Tom's performance in most subjects is in the lowest 25% range as compared to other users, the analyzer 114 determines that, in general, Tom's confidence level is low. On the other hand, if independent of subjects, Christine always works passively, and directs her questions in the unicast mode to the interaction controller, and Christine's performance in most subjects is in the highest 25% among the users, the analyzer 114 determines that Christine is a private person, and may not have a helpful attitude. Thus, as more information on a user is collected, more and more of user's traits can be identified.

Notepad

Figure 10:
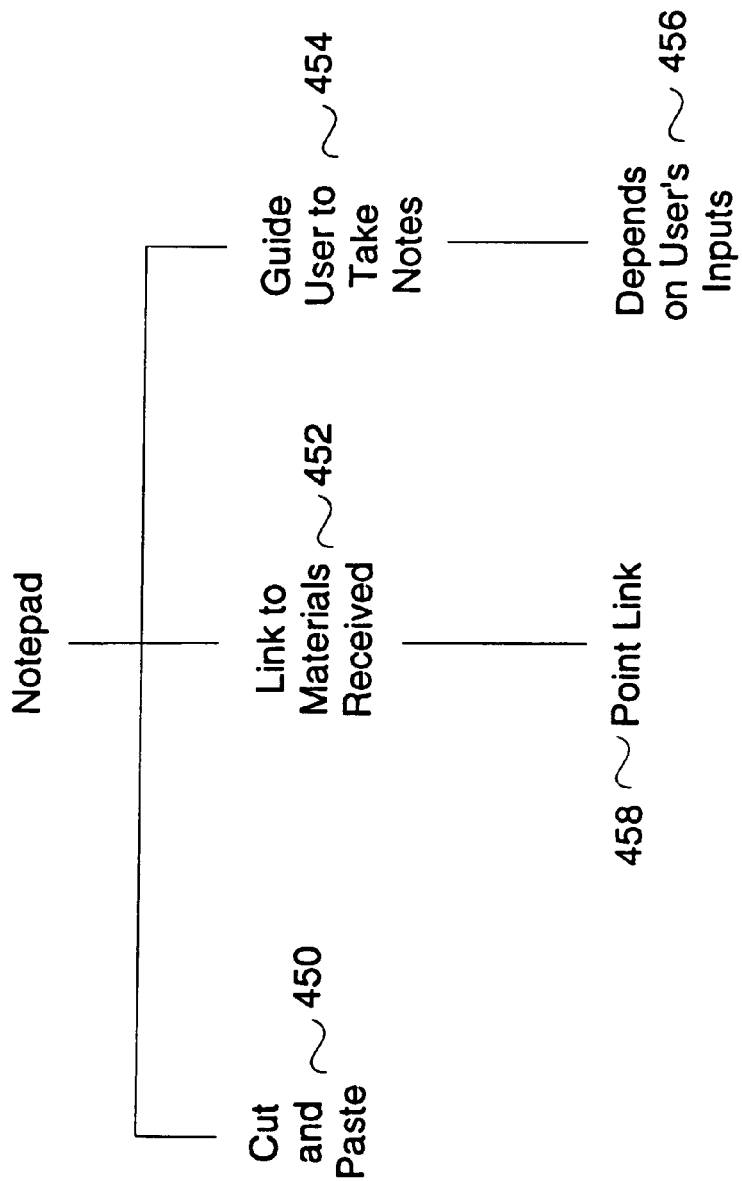
FIG. 10 shows one embodiment of some of the functions performed by the notepad of the present invention.

In another embodiment, the system includes a notepad, 122, with FIG. 10 showing one embodiment of some of the functions it performs. A notepad 122 allows a user to take notes. One embodiment allocates an area for each user in the memory for used as a user's notepad. A notepad can be shown as a small window at one corner of a screen, if an interactive device includes a monitor. In one embodiment, each notepad is coupled to the interaction controller and to its corresponding interactive device.

As Shirley is working on a subject, she can take notes in her notepad through her interactive device. The notes can be her personal property, only accessible by anyone with her key. In taking notes, Shirley can cut materials presented to her, and paste, 450, them into her notepad. She can link, 452, certain parts of her notes to materials generated by the interaction controller for her. The link can be a point link, 458. This can be done, for example, by having a dialog box marked Point Link, 216, as shown in FIG. 3. By activating that box, she can hypertext link an area in her notes to a certain point in the presented materials. She can also bookmark a certain section in the presented materials, which can be replayed if desired. The length of the section can be based on time, such as a minute of the presented materials. Shirley can also review previous notes and modifies them to reflect the latest knowledge just learnt and information just received.

In terms of implementation, in one embodiment, the system has multiprogram or multithread capability to execute more than one program at a time. This multiprogram or multithread capability also includes functions for interprogram communication, such as cut-and-paste, shared storage or memory, or messaging among programs. In this embodiment, one program is devoted to executing notepads, and another is devoted to executing communication controllers. This environment has a separate work area, such as a windowed screen, visible and accessible to a user. This area is allocated for the user to take notes. While taking notes, if Shirley intends to add a bookmark to certain materials she has received, she would mark the beginning and the end of that section of materials, and give that section a name. That name appears in her notes. Activating that name will automatically bring that section of materials to her work area for her to review.

In one embodiment with bookmarks, if there is an ending mark, but no beginning mark, the system will automatically add a mark to the beginning of the material of the current line item. Similarly, if there is a beginning mark, and no ending mark, the system will automatically add an ending mark after the end of the material of the current line item. Note that Shirley can later modify bookmarks she has previously created.

In one embodiment, point-link can be implemented in a similar same way. Shirley can link an area from her notes to a point in the materials presented to her. Those materials can belong to a line item. In one embodiment, the materials within that line item will also be stored for future access. She can again designate a name in her notes to represent that link. If she activates that name, materials starting from that point will automatically show up on her monitor, and she can also scroll back and forth materials in that line item. She can read those materials—or those materials can be read to her—until she wants to go back to her notepad. At that time, she can use a go-back key stroke to return to her notepad, just as one goes from one screen to the next screen and back when one is navigating the World Wide Web.

In one embodiment, the interaction controller also guides, 454, Shirley to take notes. One approach to guide is by generating a summary of the materials on the subject. The summary can be just key words in topic formats as illustrated in the description for finite automata. The summary can be pre-stored with the materials.

In one embodiment, there can be a dialogue box for summary in Shirley's notepad. When Shirley activates that dialogue box, Shirley's notepad sends a request to the interaction controller, which can generate the summary, and can display the summary in Shirley's notepad. As certain materials are presented to Shirley, that topic in the summary can be highlighted. Shirley then decides if she wants to add materials in that topic in her notepad.

In one embodiment, the amount of guidance to a user depends on the user's inputs, 456. For example, the amount of details in the summary for a user depends on the user's performance in the subject. If Shirley is very good in the subject, the summary might include minor topics, but not to the details of line items; however, if she is weak, the summary might include line items also. In another embodiment, the amount of details in the summary depends on the overall performance of all of the users, such as Shirley, Christine, Tom and Joe.

In yet another embodiment, the interaction controller guides Shirley by highlighting certain areas in the materials generated for her, and suggesting Shirley to take notes in those areas. The areas highlighted can depend on Shirley's performance in the subject. For example, if she really understands the subject, the interaction controller highlights very selectively. Upon Shirley's consent, such highlighted areas can be hypertext linked or copied to Shirley's notepad.

Shirley can activate the system to save her notes, including, for example, notes she has created, the summary created by the system, bookmark references, hypertext-link references and point-link references, to a storage medium for future access, or for transfer as a separate file to another destination.

Note that the notepad functions can be achieved orally. A user can take notes through dictating into a microphone, and the notes can be read back to the user.

This notepad can be used by Shirley if she is working on the subject individually, instead of in a group. In one embodiment, the system includes notepads. The interaction controller generates materials for Shirley and guides Shirley to take notes. In this embodiment, the interaction controller does not set up any dialogue sessions; for example, it can either not set up, or remove the already established, communication controller's PMP connection. Though Shirley can use the system to work on the subject individually, Shirley cannot use the system to interact with other users. This interaction controller can also monitor Shirley's inputs to the system. The interaction controller can ask Shirley questions, and monitor Shirley's answers. Based on the monitoring, the interaction controller can modify the amount of guidance to take notes.

In one embodiment, implementing such notepad features can be done through markup languages, such as HTML or SGML. Such implementation should be obvious to those skilled in the art, and will not be further described in this disclosure.

The above example is based on four to five users. However, the present invention can be used by two or more users. In one embodiment, a single user can also use the system to work on a subject individually. In another embodiment, two users are considered as a group.

In yet another embodiment, more than one users, such as two, are working on a subject. They share the same interactive device. For example, they watch materials generated on the same monitor, and they input through voice. The speech recognition system has been pre-trained to recognize the voice of each user to distinguish inputs of one user from another user. If there is ambiguity, the speech recognition system can ask the users to clarify their inputs. In another embodiment, each user has an interactive device, except that an interactive device is separated into two parts; one part is controlled by a user, and another part is shared by all of the users. For example, the users watch outputs from the same monitor and listen to outputs from the same speaker, but each has his individual input device, such as a microphone.

In one embodiment, the image of each user is displayed on at least one other user's interactive device when the users are interacting in a dialogue session. The image can be a user's picture, or an identity icon selected by the user.

In one embodiment, users communicate in a dialogue session orally through speakers and microphone. In the monitoring process, speech recognition techniques that are not 100% accurate can still be applicable in one embodiment of the invention; in other words, every word does not have to be correctly recognized. The reason why a speech-recognition accuracy of about 90% is sufficient can be shown by the example of the analysis of whether the users have been distracted away from the subject of interest; one rule is to determine whether the group's inputs have less than 25% relevancy to the subject. Such determination does not require 100% accuracy in speech recognition.

A few embodiments include implementing rules. In one embodiment, these rules are embedded into programs.

A few embodiments also describe the interaction controller setting a duration of time for a dialogue session. In one embodiment, the time to terminate the dialogue is not fixed by the duration, but has some tolerance. For example, if the set duration of time is ten minutes, right at the end of the ten-minute period, Tom is answering a question asked by the system. Then, the interaction controller can wait for Tom to finish with his communication before terminating the dialogue session; in another embodiment, the interaction controller can extend automatically the time to terminate by 30 seconds, while giving the users a signal, such as a blinking red light shown in each interactive device, that the dialogue session should be over. In such embodiments, the time to terminate is approximately at the end of the set duration; in this embodiment, 'approximately' means that the duration is not fixed, but can be modified by a tolerance period, such as 30 seconds, as provided by the interaction controller.

In yet another embodiment, the interaction controller does not generate materials on the subject to communicate to one or more users for the one or more users to work on the subject. However, the interaction controller still establishes dialogue sessions, and monitors the users' inputs to be analyzed by the performance analyzer.

One embodiment of the invention includes an interactive controller performing a number of tasks, including generating materials on a subject to communicate to one or more users for the one or more users to work on the subject, setting a duration of time for users to communicate, starting a dialogue session for users to communicate in an area related to the subject; and stopping the dialogue session approximately at or before the end of the duration of time.

One embodiment of the invention includes one embodiment of each of the following: the user registry, the interaction controller and the performance analyzer. In this embodiment, the interaction controller generates materials on a subject for one or more users who can use the system to work on the subject, and monitors at least one user's inputs to the system to be analyzed by a performance analyzer. However, the interaction controller does not provide the option of allowing the users to interact using the system.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

Appendix I

This appendix describes a number of answer generators, starting with one that can provide answers to natural-language questions that are grammatically context-free, and then to those for other types of questions. Different tasks in the following description performed by different elements can be implemented by the interaction controller.

A natural-language question can be in English or other languages, such as French. Examples of natural-language questions are:

Who is the first President?
What are the Bills of Right?
Where is the capital of Texas?

A statement that is not based on a natural language is a statement that is not commonly used in our everyday language. Examples are:

For Key in Key-Of(Table) do
Do while x>2

A grammatically-context-free question is a question whose grammar does not depend on the context. Each word in the question has its own grammatical meaning, and does not need other words to define its grammatical meaning. Hence, the grammatical structure of the question does not depend on its context.

The question includes one or more grammatical components. A grammatical component is a component with one or more grammatical meanings, which are defined by a set of grammatical rules to be explained below. For example, the word "president" is a noun, which has a grammatical meaning. So the word "president" is a grammatical component.

In one embodiment, the question-answering approach includes a database with a number of tables. The data in each table can be further divided into different areas, and each area is represented by an attribute. Some values or data in the database may be unique. Such values are known as key values, and their corresponding attributes are known as key attributes.

One embodiment of the database includes a grammatical table, one or more topic-related tables, and two semantic tables. In a general sense, the grammatical table determines the grammatical meaning of each word in the question, such as whether a word is a noun or a verb. Each topic-related table groups data related to a topic together in a specific format. Separated into a topic-dependent semantic table and a topic-independent semantic table, the semantic tables define the semantic meaning of each word, such as whether a word refers to an algorithm or data in a topic-related table.

The grammatical table defines the grammatical meanings of words used in the natural-language question. If questions entered into the system is limited to only one subject, such as history, the grammatical table will include words in that subject, and words commonly-used by a user of the system in asking questions.

Each topic-related table combines data related to a topic in a specific format.

There is also a table-structure dictionary, which defines how the topic-related tables arrange their data. This dictionary is typically not considered as a part of the database. It does not contain topic-related data, but it contains structures of the topic-related tables in the database.

A word in the question may need one or both of the semantic tables. The topic-independent semantic table defines whether a word stands for an algorithm or data in a topic-related table. Such a table may be defined as follows:

```
CREATE TABLE Topic_Independent_Semantic (
    word          NOT NULL,   // the word
    semantics,                // Indicates if the word refers to data in a
                              // topic-related table, an algorithm etc. If the
                              // word is mapped to an algorithm, that
                              // algorithm will also be identified, as will be
                              // further explained below.
    synonym,                  // A word might have synonyms, as will be
                              // further explained below.
)
```

Words with similar meaning are grouped together and are represented by one of those words as the synonym for that group of words.

Many words do not point to an algorithm. They correspond to data in topic-related tables. The topic-dependent semantic table identifies the semantic meaning of those words through matching them to data in topic-related tables. Such a topic-dependent table may be defined as follows:

```
CREATE TABLE Topic_Dependent_Semantic (
    Table_Name NOT NULL,      // For a table with the name Table_Name:
        Who_Attribute,        // The attribute associated with 'who'
        When_Attribute,       // The attribute name associated with 'when'
        {i-pronoun}_Attribute,   // The attribute associated with an
                              // interrogative pronoun or i-pronoun.
                              // The symbols { } denote the word it
                              // contains. Here, the word is an i-pronoun.
        ...
        {Adj}_Attribute,
            // The attribute associated with the adjective {adj}. In this
            // example, the word is an adjective.
```

```
        {Noun}_Attribute,
                // Attribute name associated with the noun {noun}. Certain
                // nouns may refer instead to an algorithm, such as
)
```

In general terms, a grammatical structure analyzer can analyze the grammatical structure of a natural-language question so as to parse it into its grammatical components, based on a pre-defined context-free grammatical structure. This task uses a set of grammatical rules and the grammatical table. Then, the system transforms at least one component into one or more instructions using a set of semantic rules with one or both of the semantic tables. Finally, one or more steps are executed to access and process data from one or more topic-related tables so as to generate an answer to the question.

Analyze Grammatical Structure

In one embodiment, the analyzer scans the question to extract each word in the question. Then the analyzer maps each extracted word to the grammatical table for identifying its grammatical meaning. After establishing the grammatical meaning of each word, the analyzer uses a set of grammatical rules to establish the grammatical components of the question based on a pre-defined context-free grammatical structure.

In one embodiment, the pre-defined context-free grammatical structure is as follows:

The programming-steps generator transforms at least one grammatical component of the question using a set of semantic rules and one or both of the semantic table to generate a set of instructions. The semantic rules and the semantic tables depend on the pre-defined context-free grammatical structure, which the parsing process bases on.

To help explain question-answering approaches, a number of functions are created as shown in the following:

Keys-Of(Table) This function extracts all the key attributes in the identified table.

Attributes-Of(Table) This function extracts all the attribute names in the identified table.

Attribute-Names({adjective}, Table) This function identifies one or more attributes when the {adjective} is applied to the table.

Attribute-Names({noun}, Table) This function identifies one or more attributes when the {noun} is applied to the table.

Attribute-Name({i-pronoun}, Table) This function identifies the attribute when the {i-pronoun} is applied to the table.

```
<Question> = <i-pronoun> <aux-verb> <noun-phrase> [<verb-phrase>]
where: the symbols <> denote whatever inside is a meta-symbol, which has a
        grammatical meaning; the meta-symbol is not in the grammatical table.
        The symbols [ ] denote whatever inside the bracket is optional.
<I-pronoun> denotes an interrogative pronoun, which is a pronoun used in asking
        questions, and can be one of the following: what, when, where, who, whom,
        whose, which, and why.
<Aux-verb> denotes an auxiliary verb, and can be any form of the verb "to be," or
        "do."
<Noun-phrase> is defined as <group-of-nouns> [<prepositional-noun-phrase>]
        where: <group-of-nouns> is defined as:
                [<modify-article>] <adjective>*<one-or-more-nouns>;
                        the symbol * denotes zero or more;
                        <modify-article> is defined as a modified article, including a,
                                an, the, this, these and those; and
                        <one-or-more-nouns> denotes one or more nouns; and
                <prepositional-noun-phrase> is defined as a
                        <preposition> <noun-phrase>.
<Verb-phrase>denotes a non-aux-verb, and
        is defined as <non-aux-verb> [<prepositional-noun-phrase>].
<Preposition> denotes a preposition defined in the grammatical table.
<Non-aux-verb> denotes a verb defined in the
        grammatical table and is not an <aux-verb>
<Noun> denotes a noun defined in the grammatical table.
<Adjective> denotes an adjective defined in the grammatical table.
```

A word or a set of words that can fit into the structure of a meta-symbol is a grammatical component. For example, the phrase "with respect to x" is a grammatical component, whose grammatical meaning is a prepositional-noun-phrase.

The grammatical table defines the grammatical meaning of each word.

Many questions cannot be parsed based on the pre-defined context-free grammatical structure. These questions are considered as ambiguous questions, and will be analyzed through methods explained later.

Programming-steps generator

- Tables-Of({proper noun})
  This function identifies one or more tables that contain the {proper noun} as a key value. It can be derived by the following program:
  ```
  T-Names ="";
  for Table in {all Tables} // (all Tables} is a list of topic-related tables
  do
          for Key in Keys-Of(Table)
          do
                  if any value of the attribute Key in the Table contains (proper noun}
                                  then T-Names = T-Names + Table
                  endif
          endfor
  endfor
  return T-Names
  ```
- Synonym({word})

This function identifies the synonym corresponding to the word. The synonym can be found in the topic-independent-semantic table.

Based on a number of semantic rules and the grammatical components in the question, the programming-steps generator generates instructions. Examples are provided in the following.

A Proper Noun

A grammatical component in the question can be a proper noun, which implies that it has a grammatical meaning of a proper noun. One set of semantic rules is that the programming-steps generator transforms the proper noun into instructions to select one or more topic-related tables, and then transforms other grammatical components in the question into instructions to select and to operate on data in the tables for answering the question.

Using the topic-dependent semantic table, the programming-steps generator first retrieves all tables where the proper noun is an attribute. Then, as shown in the topic-dependent semantic table, all key attributes in those tables are identified, and each of them is matched to the proper noun. The table of any key attribute that matches the proper noun is selected for additional operation by the remaining grammatical components in the question.

In one example, the corresponding instructions are as follows:

If the noun denotes an attribute name or a synonym of an attribute name, again as shown by the topic-dependent semantic table, the programming-steps generator searches and identifies the attribute based on the noun. After all of the relevant attributes have been identified, data in them are retrieved for further processing by other parts of the question to generate an answer.

If the noun denotes the data under an attribute, the programming-steps generator identifies the data, with its corresponding attribute and table. The instructions generated can be, for example, (1) identifying each table in the function Tables-Of({noun}); (2) for each table identified, the function Attribute-Names({noun}, Table) returns the corresponding attributes containing the {noun} in that table; and (3) the remaining parts of the question operate on information under each attribute to generate the answer to the question. One set of instructions achieving such objectives is as follows:

```
for Table in Tables-Of({noun})
do
        ...
        for Attribute in Attribute-Names({noun}, Table)
        do
```

```
for Table in Table-Of({proper noun})
do
        for Key in Keys-Of(Table)
        do
                x = (SELECT ...
                      FROM Table
                      WHERE Key MATCH {proper noun})
                      // The above clause has the meaning of "where the key attribute
                      // in the table matches the proper noun."
                if x is valid then done
                // if the SELECT function successfully identifies one or more attributes,
                // x is valid.
        endfor
endfor.
```

Common nouns

One grammatical component in the question can be a common noun. The programming-steps generator might transform the common noun into instructions to select a topic-related table, an attribute name, a synonym of an attribute name, the data under an attribute, or an algorithm.

-continued

```
SELECT ...
      FROM Table
      WHERE Attribute = {noun}
...
```

```
       endfor
           ...
endfor
```

The programming-steps generator might identify the algorithm corresponding to the noun; the algorithm is then applied to data selected by grammatical components in the question other than the common noun.

Non-Auxiliary Verbs

One grammatical component can be a non-auxiliary verb. It relates to one or more events or an action, which has a number of attributes; and it might have words with similar meaning. One approach is to identify the verbs with similar meaning. Then other components in the question identify data in the attributes of the identified verbs for answering the question.

A verb can be related to many different events. As an example, the verb is "nominate": one event can be President Bush being nominated to be the President, and another event can be President Clinton being nominated to be the President.

However, an event is related to a verb. The attributes of the event can have a subject-agent, which is the agent performing the event, such as the party nominating the president. Typically, the preceding noun phrase before the verb identifies the subject-agent. The event can have an object-agent if the verb is a transitive verb, which is the agent acted upon by the event, such as the president being nominated.

Each event has a duration that is between a starting and an ending time. For example, if the event is "walk" its duration starts with the sole of a foot changing its position from touching the ground to not touching the ground, and then ends with the sole back to touching the ground again.

Non-auxiliary verbs are grouped together in an event table, which is a topic-related table, with the topic being events. The following is an example of an event in the table:

```
CREATE TABLE EVENT (
    Verb_word         Character String NOT NULL,
                         // The verb that associates with the event
    Subject_Agent     Character String,    // Agent name performing the event
    Object_Agent      Character String,    // Agent name acted upon by the
                                           // event
    Start_Time        Time,                // Starting time of event
    End_Time          Time,                // Ending time of event
    Description       Character String,    // Describes the event
    KeyId             Integer,             // Unique number identifying the event
)
```

The subject-agent, object_agent etc. are attributes related to the verb_word, which is associated with an event.

There might be non-auxiliary verbs with similar meaning as the non-auxiliary verb in the question. These verbs can be identified by the synonym in the topic-independent semantic table. As an example, the verbs of breathe and inhale have similar meaning.

The programming-steps generator transforms the non-auxiliary verb in the question into one or more instructions, which select one or more verbs with their attributes in the event table. The one or more verbs have similar meaning as the non-auxiliary verb. Then other components in the question identify data in the attributes for answering the question.

The selected verbs can be put into a temporary table or a view (a database terminology) as follows:

```
CREATE VIEW Verb_View({verb}) As
    // View is a logical table that is created only when it is needed.
    // All events matching {verb} are grouped from the event table
    // to form the view.
    SELECT * FROM EVENT
        // here * denotes all of the attributes
        WHERE Synonym({verb}) = Verb_word;
```

The attributes of the selected verbs are also identified. Then, the programming-steps generator generates additional instructions based on other components in the question to identify data in the selected attributes for answering the question.

Events might be related. Two events may form a sequential relationship, where one event follows another event, such as eat and drink. Two events may form a consequential relationship, such as braking and stopping, with the braking event causing the stopping event. Many small events may make up a big event, with the big event containing the small events; this leads to containment relationships. Also, events may be related because they involve the same subject-agent; and events may be related because they involve the same object-agent.

An event-relationship table describes relationships among events. It can have the following format:

```
CREATE TABLE EVENT_RELATIONSHIP (
    KeyId1        Integer,           // KeyId of an event
    KeyId2        Integer,           // KeyId of another event
    Relationship  Character String,
        //Retationship, such as sequential, consequential, containment etc.
)
```

Interrogative Pronouns

Based on the interrogative pronoun in the question, the programming-steps generator generates one or more instructions to select one or more attributes in one or more tables. Those tables have been selected by grammatical components in the question other than the interrogative pronoun. The function Attribute-Name({i-pronoun}, Table) generates the attribute name corresponding to the {i-pronoun}.

One way to generate a SQL-like instruction corresponding to the {i-pronoun} is to modify a SELECT clause:

SELECT Attribute-Name({i-pronoun}, Table) FROM Table

Determiners

Examples of a set of semantic rules on determiners are:

If the determiner is "a" or "an," select any result from the previous query.

If the determiner is "some," select more than one result from the previous query. If the previous query yields only one result, that result will be selected.

If the determiner is "all," select all result from the previous query.

If the determiner is "the," modify the following SELECT function with DISTINCT, as will be shown by examples below.

Auxiliary Verbs

An auxiliary verb together with either its immediate noun phrase or a non-auxiliary verb determine whether the answer should be singular or plural.

Adjectives

One grammatical component of the question can be an adjective. Based on the adjective, the programming-steps generator either identifies the value of an attribute, or identifies an algorithm. The grammatical components in the question other than the adjective have already selected one or more topic-related tables.

As shown by the topic-independent semantic table, the adjective may identify an attribute. The function Attribute-Names({adjective}, table) can retrieve the attribute in the previously selected. The corresponding instruction can be:

```
for Attribute in Attribute-Names({adjective}, Table)
do
    SELECT . . .
        FROM Table
        WHERE Attribute = {adjective}
        // or "Where the attribute in the table is equal to the adjective."
    . . .
endfor
```

An adjective can refer to an algorithm, as identified by the topic-independent semantic table. Grammatical components in the question other than the component that is the adjective have selected one or more topic-related tables. As shown in the topic-independent semantic table, the adjective identifies one or more attributes in those tables. Then the algorithm operates on one or more data in those attributes.

Preposition

One grammatical component can be a preposition. A preposition can modify its previous noun phrase or verb, such as by operating on them through an algorithm identified in the topic-independent semantic table. Under some situations, with one or more tables selected by at least one grammatical component in the question other than the component that is the preposition, the algorithm identified operates on data or values in the one or more selected tables.

Under some other situations, for example, due to the prepositions 'of' and 'in', the programming-steps generator processes the grammatical component succeeding the preposition before the grammatical component preceding.

For another example, the preposition 'before' can modify the WHERE clause with a comparison on time:

(time of preceding event)<(time of succeeding event)

Programming-Steps Executor

The executor executes at least one set of instructions generated from one grammatical component to at least access data from the database to generate an answer for the question, if there is one.

In one embodiment, after the programming-steps generator generates a set of instructions, the programming-steps executor executes them. The set may be generated from one grammatical component. This process repeats until all sets are generated and executed to answer the question. For at least one set of instructions, the executor accesses data from one or more topic-related tables identified by the instructions. In another embodiment, all the instructions are generated; then the program executor runs the instructions, which include accessing data from one or more topic-related tables identified by the instructions, and processing those data for generating the answer to the natural-language question.

Example

The following shows examples of instructions automatically generated to answer grammatically-context-free questions.

```
1.    Who is the first President?
for Table in each Tables-Of(President)
do
    for Attribute1 in Attribute-Names(President, Table)
    do
        for Attribute2 in Attribute-Names(first, Table)
        do
            res = (SELECT DISTINCT Attribute-Name(who, Table)
                FROM Table
                WHERE Attribute1 = "President"
                ORDER BY Attribute2 ASC)
            if (res is not empty) return (first element of results}
        end for
    end for
end for
return {error, no solution found}
```

As clearly shown in this example, the analysis starts with the noun phrase, the first President, and works towards the i-pronoun, who.

```
2.    What are the Bills of Right?
answer = ""
for Table in each Tables-Of("Bills of Right")
do
    for Key in Keys-Of(Table)
    do
        x = (SELECT Attribute-Name(what, Table) FROM Table
            WHERE Key LIKE 'Bills of Right');
        answer = answer + x
    endfor
endfor
``` if answer is not empty, return answer, otherwise return error.

As clearly shown in this example, the analysis starts with the noun phrase, the bills of rights, and work towards the i-pronoun, what.

Ambiguous Questions

The grammatical structure analyzer may decide that the natural-language question cannot be parsed into grammatical components based on the pre-defined context-free grammatical structure. For example, the grammatical components of the question cannot fit into the pre-defined structure. Then the question is considered ambiguous, and an answer cannot be generated by the above method.

Ambiguity may be due to a number of reasons. For example, the question may contain words with non-unique grammatical meaning, the question may contain words not in the grammatical table, or the grammatical structure of the question is different from the pre-defined grammatical structure.

The grammatical structure analyzer can decide that a word can be of more than one grammatical meaning, such as it can be a noun and a verb. In one embodiment, the analyzer produces an answer for each meaning and ignores those meaning with no answer. In another embodiment, the analyzer asks the user to identify the correct grammatical meaning.

If the grammatical structure analyzer decides that the question contains one or more words not in the grammatical table, in one embodiment, the analyzer removes the un-recognized word and processes the remaining words in the question. In another embodiment, the analyzer asks the user for a different word. The analyzer might assume that the word is mis-spelled, and ask the user to correct it; the analyzer might replace the un-recognized word with a word in the grammatical table most similar to or with minimum number of different characters from the un-recognized word. The analyzer then presents the matched word to the user to ask if that is the right word. A list of matched words may be presented for the user to select.

Also, the answer generator can present suggestions to the user on ways to rephrase the original question based on the noun and the non-auxiliary verbs. It would then be up to the user to select the one he wants.

Questions Matching Engine

Another embodiment of the answer generator provides answers even to non-natural-language questions, and grammatically-context-dependent questions. In this embodiment, the database includes a questions table, which contains many questions, each with its corresponding answer. A question matching engine compares the question entered with questions in the database. An answer retriever retrieves the answer to the question in the database that matches the entered question. If no question in the database matches the input question, the answer generator might use one of the approaches discussed in the ambiguous questions section to answer the question.

We claim:

1. A computer-aided group-learning method for more than one user to work on a subject, the method comprising the steps of:

setting a duration of time for users to communicate in a dialogue session so as to allow the users to work on materials on the subject; and monitoring at least one user's inputs during the dialogue session so as to have the monitored inputs available for analysis to guide at least one user back to the subject in the dialogue session when one or more users have been distracted from the subject;

such that the dialogue session provides an interactive environment to help the users learn.

2. A computer-aided group-learning method as recited in claim 1 wherein the materials for at least one user to work on are tailored to that user based on monitored inputs.

3. A computer-aided group-learning method as recited in claim 1 further comprising the step of responding to a user's natural-language question.

4. A computer-aided group-learning method as recited in claim 1 further comprising the step of restricting one user from communicating with at least one other user.

5. A computer-aided group-learning method as recited in claim 1 wherein the analysis includes analyzing the relevancy of the user's inputs.

6. A computer-aided group-learning method as recited in claim 1 wherein the analysis is also for generating a profile of one or more users.

7. A computer-aided group-learning method as recited in claim 1 further comprising the step of restricting one or more users who can work on the subject.

8. A computer-aided group-learning method as recited in claim 7 wherein the restriction is on limiting a user to observing but not interacting in the dialogue session.

9. A computer-aided group-learning method as recited in claim 1 further comprising the step of restricting a potential user from learning the subject with the more than one users based on information related to the potential user.

10. A computer-aided group-learning method as recited in claim 1 further comprising the step of retrieving information related to one or more users for a potential user to decide on learning the subject with the one or more users.

11. A computer-aided group-learning method as recited in claim 1 further comprising the step of guiding the user to take notes on the subject so as to help the user learn the subject;

wherein the guidance is related to the subject.

12. A computer-aided group-learning method as recited in claim 1 wherein:

the users communicate in a mode of communication; and the mode of communication can be selected from a unicast, multicast and broadcast mode.

13. A computer-aided group-learning system for more than one user to work on a subject, the system comprising:

a controller configured to set a duration of time for users to communicate in a dialogue session so as to allow the users to work on materials on the subject; and a monitoring apparatus configured to monitor at least one user's inputs to the system during the dialogue session so as to have the monitored inputs available for analysis to guide at least one user back to the subject in the dialogue session when one or more users have been distracted from the subject;

such that the dialogue session provides an interactive environment to help the users learn.

14. A computer-aided group-learning system for more than one user to work on a subject the system comprising:

a plurality of notepads, with at least two of said notepads coupled together to allow information to communicate between each other;

at least one of the notepads being configured for a user to take notes while working on the subject through the system; and a notepad controller configured to monitor the user's inputs to guide the user to take notes on the subject so as to help the user learn that subject;

wherein the guidance is related to the subject, and the system allows more than one user to work on the subject in a dialogue session to help the users learn.

15. A computer-aided learning system as recited in claim 14 wherein the guidance is presented in the notepad.

16. A computer-aided learning system as recited in claim 14 wherein the guidance depends on the user's strength in the subject.

17. A computer-aided learning system as recited in claim 14 wherein the system is configured to allow the user to cut materials on the subject the user has received, and paste the materials in the notepad.

18. A computer-aided learning system as recited in claim 14 wherein the system is configured to allow the user to link the notes taken to the subject's materials that the user is working on.

19. A computer-aided group-learning system as recited in claim 18 wherein the link is from an area in the notes to a point in the materials.

20. A computer-aided group-learning method for more than one user to work on a subject, the method comprising the steps of:

providing a plurality of notepads, with at least two of said notepads coupled together to allow information to communicate between each other;

allocating an area in a notepad for a user to take notes while working on the subject; and monitoring the user's inputs to guide the user to take notes on the subject so as to help the user learn the subject;

wherein the guidance is related to the subject, and the method allows more than one user to work on the subject in a dialogue session to help the users learn.

* * * * *